United States Patent
Tanaka

(10) Patent No.: US 9,945,277 B2
(45) Date of Patent: Apr. 17, 2018

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Hiroyuki Tanaka, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 68 days.

(21) Appl. No.: 15/228,477

(22) Filed: Aug. 4, 2016

(65) Prior Publication Data
US 2017/0037757 A1 Feb. 9, 2017

(30) Foreign Application Priority Data
Aug. 6, 2015 (JP) ................... 2015-155952

(51) Int. Cl.
| | |
|---|---|
| *F01N 3/00* | (2006.01) |
| *F01N 3/10* | (2006.01) |
| *F02D 41/02* | (2006.01) |
| *F02D 41/14* | (2006.01) |

(Continued)

(52) U.S. Cl.
CPC .......... *F01N 3/101* (2013.01); *F02D 41/028* (2013.01); *F02D 41/0235* (2013.01); *F02D 41/1441* (2013.01); *F02D 41/1455* (2013.01); *F01N 3/0842* (2013.01); *F01N 3/2066* (2013.01); *F01N 3/2073* (2013.01); *F01N 2430/06* (2013.01); *F01N 2560/025* (2013.01); *F01N 2560/026* (2013.01); *F01N 2560/14* (2013.01); *F01N 2610/02* (2013.01); *F01N 2900/0408* (2013.01); *F01N 2900/1402* (2013.01); *F01N 2900/1614* (2013.01); *F01N 2900/1622* (2013.01); *F01N 2900/1624* (2013.01); *F02D 2200/0806* (2013.01);
(Continued)

(58) Field of Classification Search
USPC .......... 60/274, 285, 286, 295, 297, 301, 303
See application file for complete search history.

(56) References Cited

U.S. PATENT DOCUMENTS

| | | | |
|---|---|---|---|
| 7,892,508 B2 * | 2/2011 | Katoh ................... | F01N 3/0814 422/105 |
| 8,297,046 B2 * | 10/2012 | Bandl-Konrad ... | B01D 53/9431 422/172 |

(Continued)

FOREIGN PATENT DOCUMENTS

JP 5534020 B2 6/2014

*Primary Examiner* — Binh Q Tran
(74) *Attorney, Agent, or Firm* — Andrews Kurth Kenyon LLP

(57) ABSTRACT

A three-way catalyst, an NSR catalyst, and an SCR catalyst are provided in this order for an exhaust gas passage, wherein the air-fuel ratio (AFR) is set to a first AFR which is a rich AFR before the AFR is switched from a theoretical AFR to a lean AFR, and then the AFR is set to a second AFR which is higher than the first AFR and lower than the theoretical AFR if a NOx occlusion amount is less than a threshold value during a period until an $NH_3$ adsorption amount of the SCR catalyst becomes a predetermined adsorption amount, while the AFR is set to a third AFR which is higher than the first AFR and lower than the second AFR if the NOx occlusion amount is not less than the threshold value.

5 Claims, 8 Drawing Sheets

(51) Int. Cl.
*F01N 3/08* (2006.01)
*F01N 3/20* (2006.01)

(52) U.S. Cl.
CPC ............... *F02D 2200/0808* (2013.01); *F02D 2200/0814* (2013.01); *Y02T 10/22* (2013.01)

(56) References Cited

U.S. PATENT DOCUMENTS

| | | | | |
|---|---|---|---|---|
| 8,555,617 | B2* | 10/2013 | Mital | F01N 3/033 60/295 |
| 8,677,734 | B2* | 3/2014 | Ramanathan | F01N 3/0814 60/274 |
| 9,816,415 | B2* | 11/2017 | Hokuto | F01N 3/0885 |
| 2016/0115891 | A1* | 4/2016 | Suzuki | F01N 3/2073 60/276 |

\* cited by examiner

[Fig. 1]
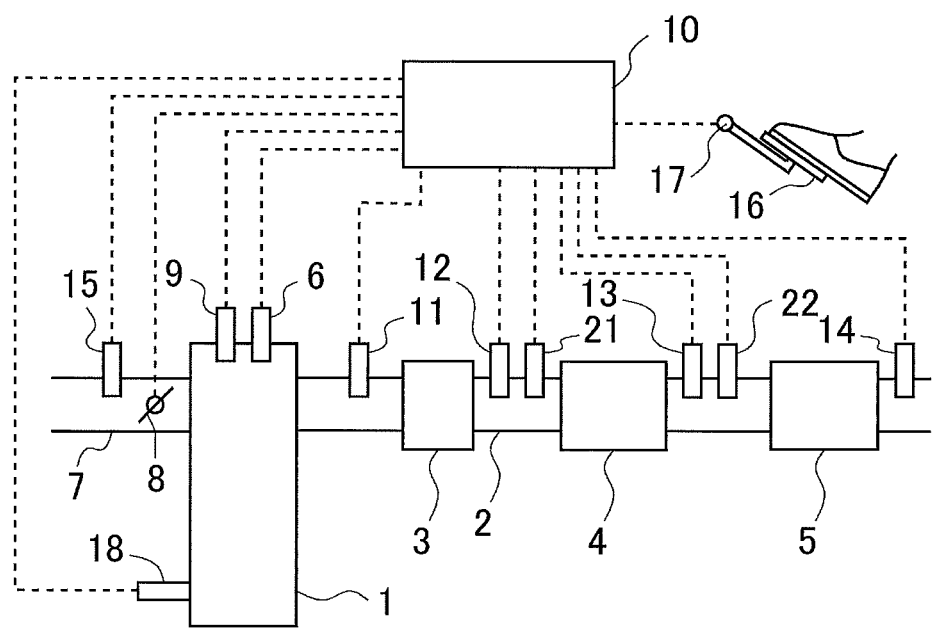

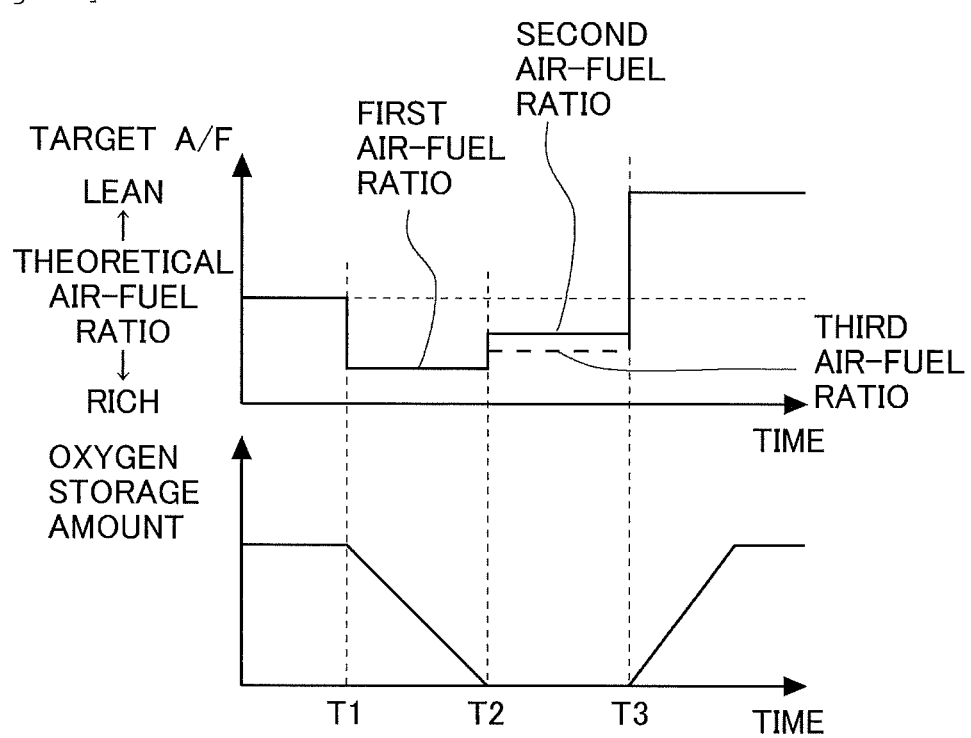
[Fig. 2]

[Fig. 3]
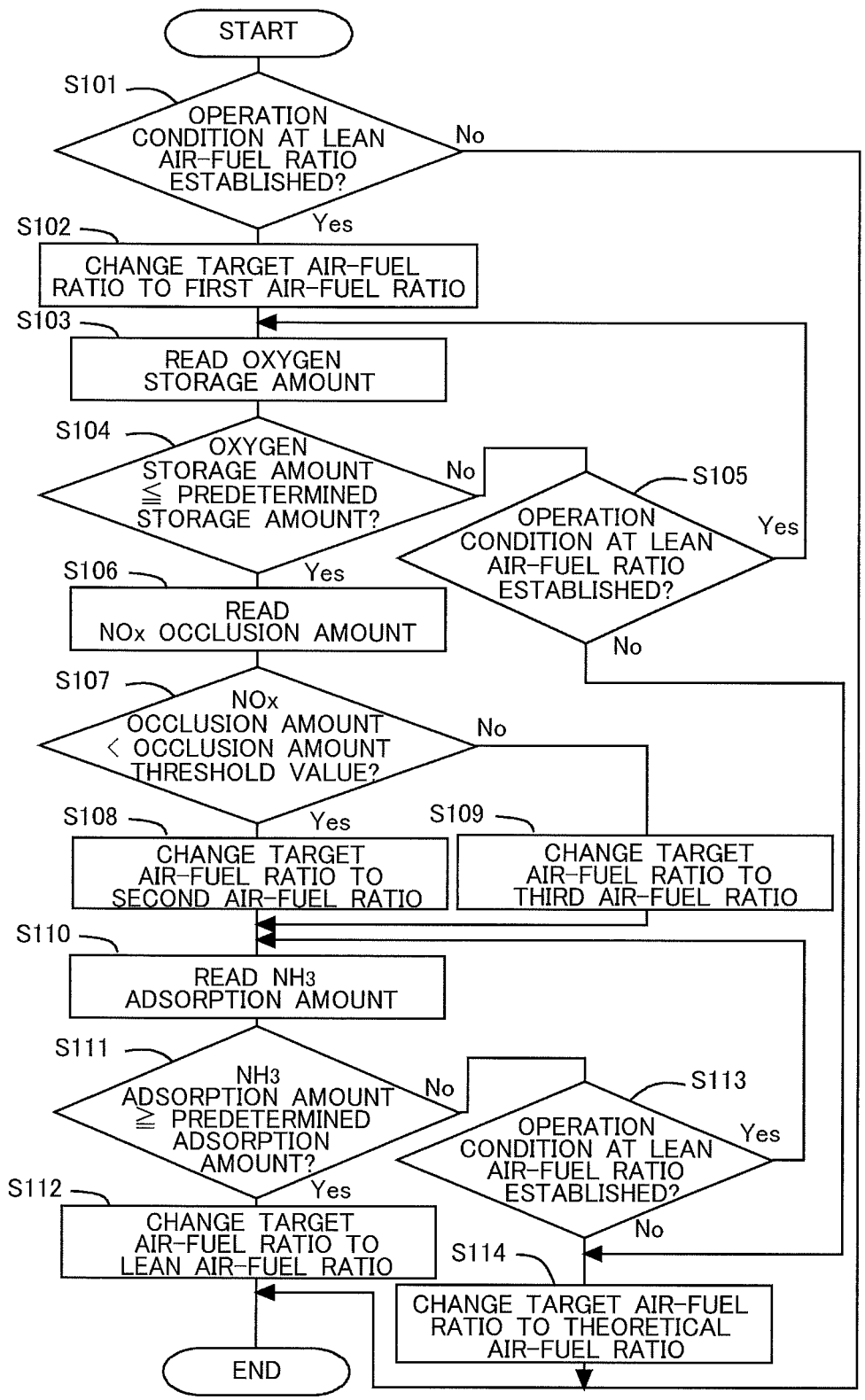

[Fig. 4]
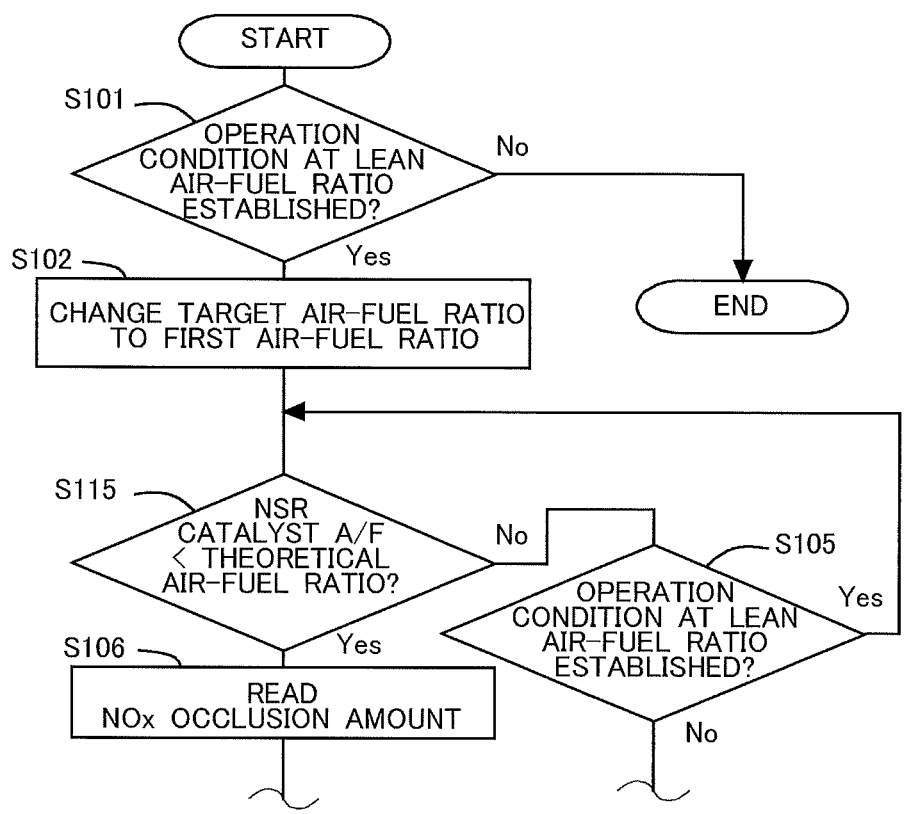

[Fig. 5]
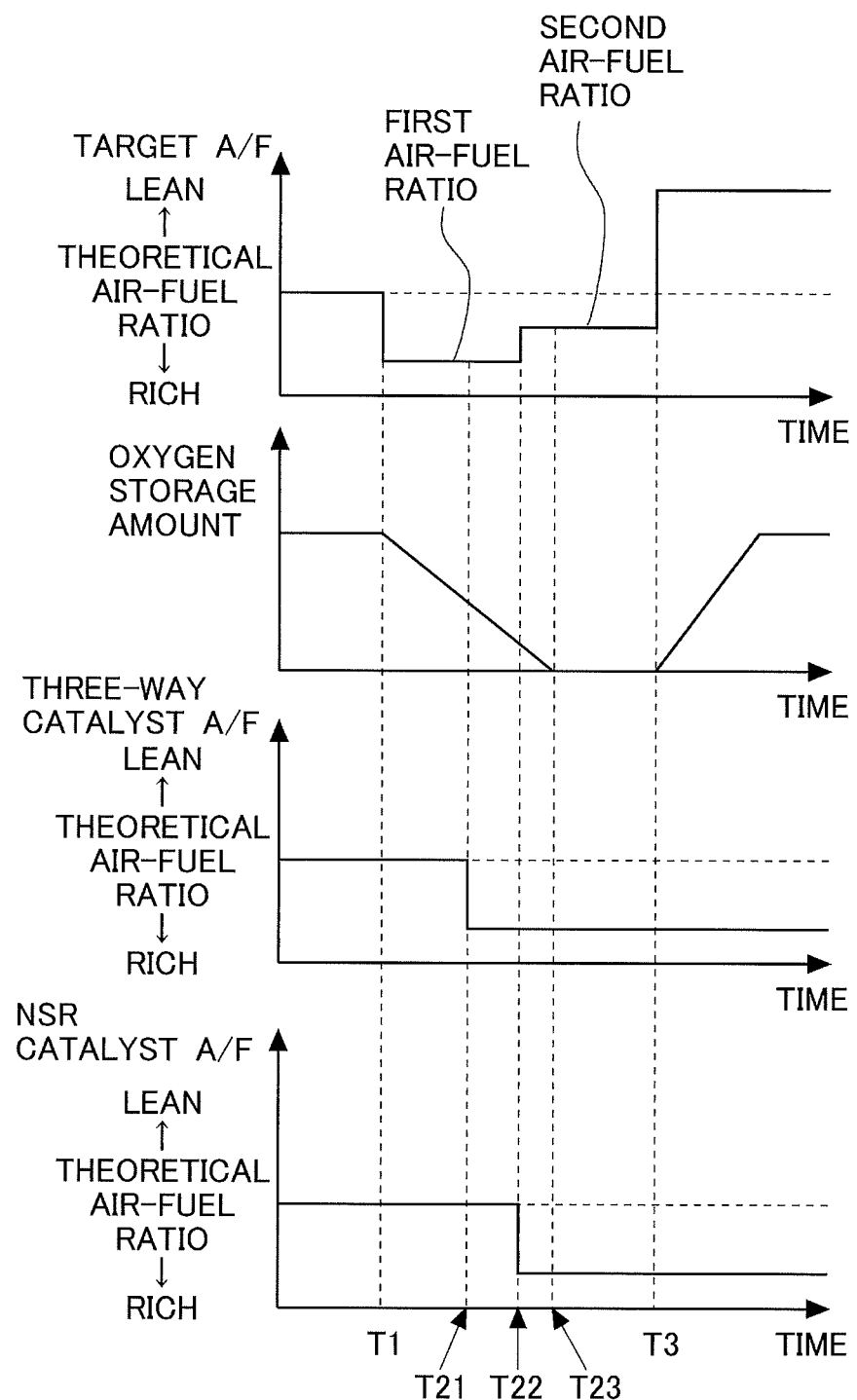

[Fig. 6]
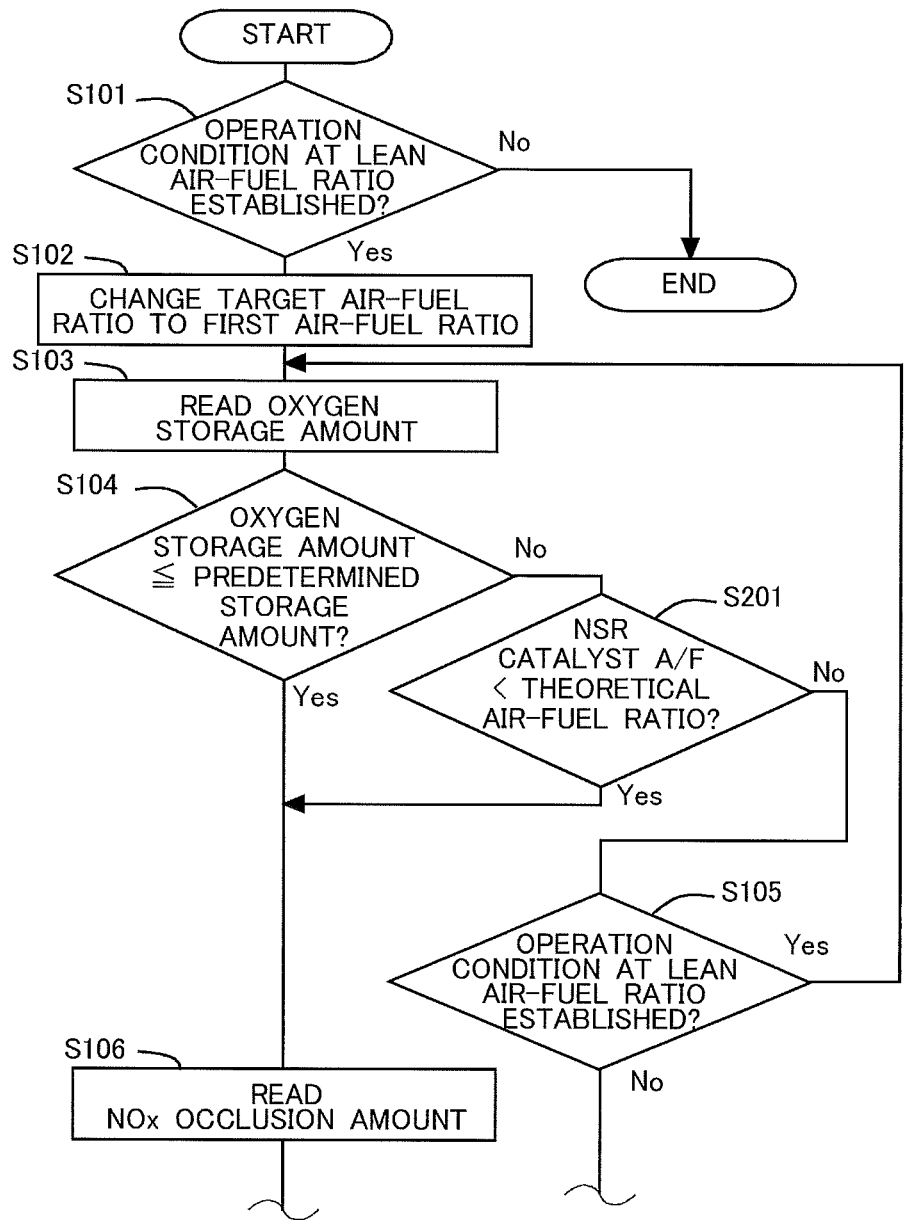

[Fig. 7]
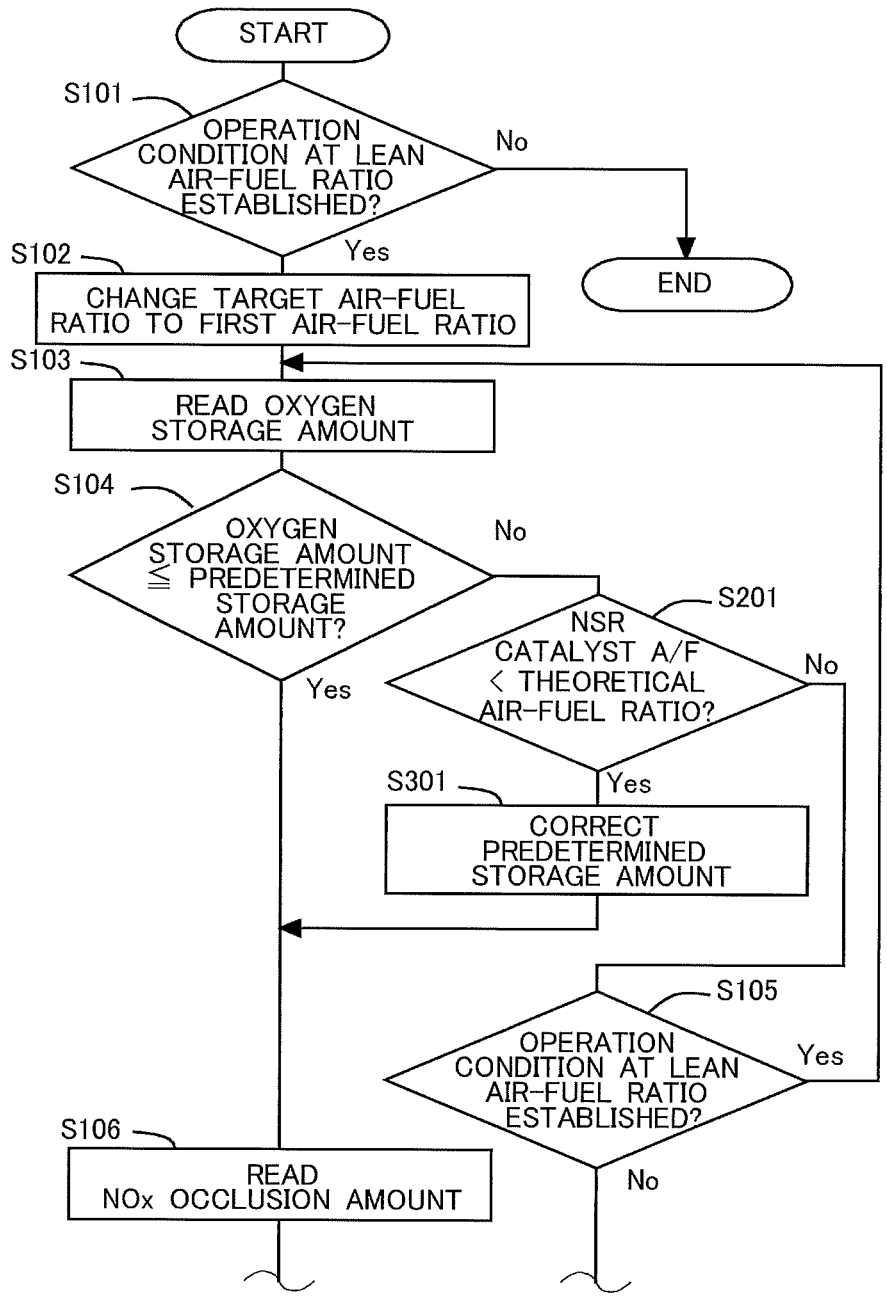

[Fig. 8]
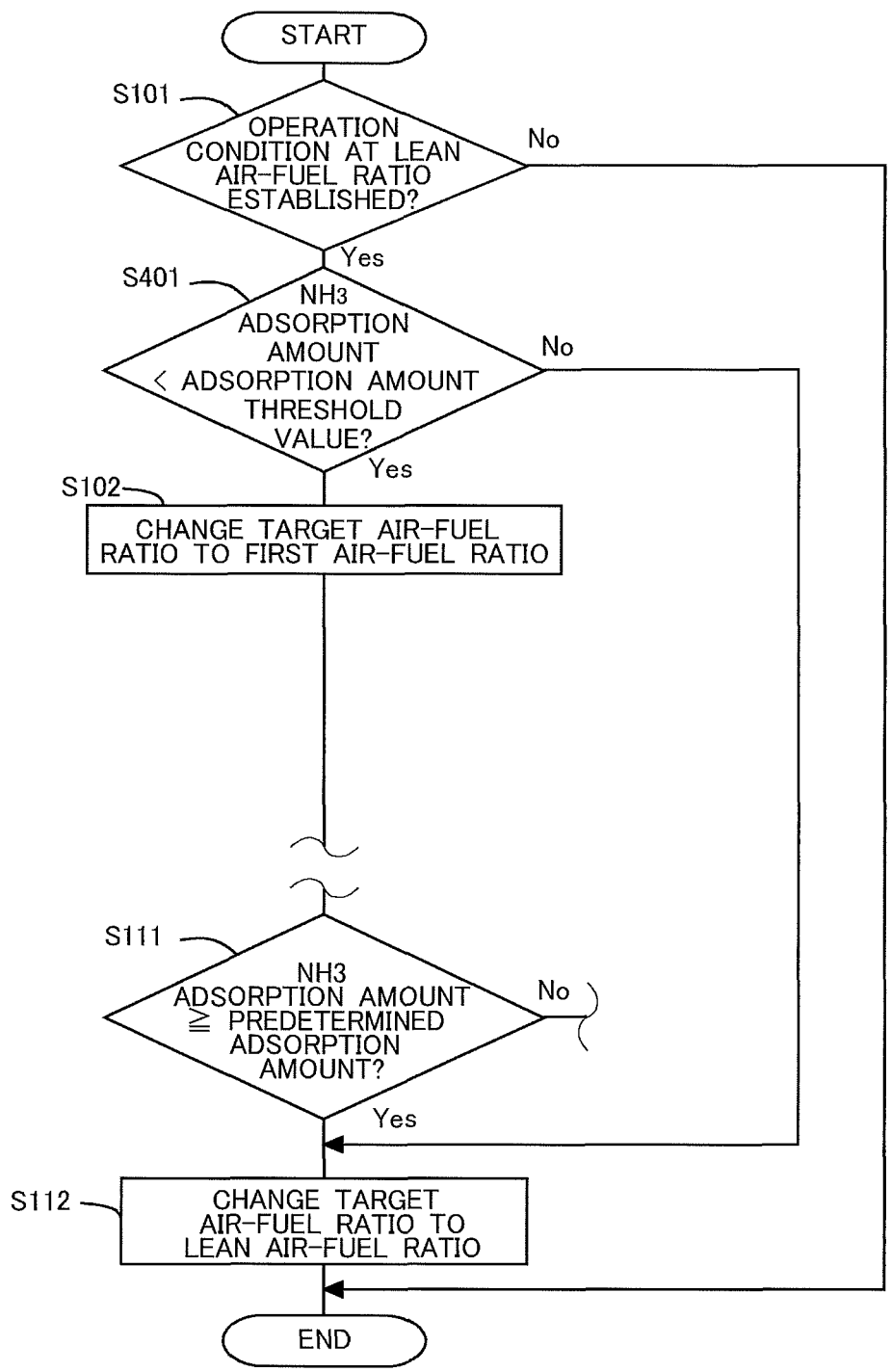

EXHAUST GAS PURIFICATION APPARATUS FOR INTERNAL COMBUSTION ENGINE

CROSS REFERENCE TO RELATED APPLICATIONS

This application claims priority to Japanese Patent Application No. 2015-155952 filed on Aug. 6, 2015, the entire contents of which are incorporated by reference herein.

TECHNICAL FIELD

The present invention relates to an exhaust gas purification apparatus for an internal combustion engine.

BACKGROUND ART

It is known that a three-way catalyst, a storage reduction NOx catalyst (NOx storage reduction catalyst) (hereinafter referred to as "NSR catalyst" as well), and a selective catalytic reduction NOx catalyst (hereinafter referred to as "SCR catalyst" as well) are arranged in this order from the upstream side of an exhaust gas passage of an internal combustion engine which can be operated at a lean air-fuel ratio. The NSR catalyst occludes (absorbs or stores) NOx contained in the exhaust gas when the oxygen concentration of the inflowing exhaust gas is high, while the NSR catalyst reduces NOx having been occluded when the oxygen concentration of the inflowing exhaust gas is lowered and any reducing agent is present. The SCR catalyst selectively reduces NOx by means of the reducing agent. Then, HC and/or $H_2$ contained in the exhaust gas is/are reacted with NOx in the three-way catalyst or the NSR catalyst, and thus $NH_3$ is produced. This $NH_3$ can be utilized as the reducing agent in the SCR catalyst.

In the construction described above, the rich spike, by which the air-fuel ratio of the exhaust gas is temporarily made to be a rich air-fuel ratio, is executed in order to produce $NH_3$ in the three-way catalyst or the NSR catalyst. In this context, a technique is known, in which the target air-fuel ratio is switched during the rich spike from a first air-fuel ratio to a second air-fuel ratio which is the air-fuel ratio higher than the first air-fuel ratio (see, for example, Patent Literature 1). In this way, $NH_3$ can be produced at an early stage by promptly releasing oxygen from the three-way catalyst and the NSR catalyst by further lowering the air-fuel ratio of the exhaust gas at the initial stage of the rich spike.

In the meantime, even in the case of the internal combustion engine which can be operated at the lean air-fuel ratio, the internal combustion engine is also operated at the theoretical air-fuel ratio, for example, during the high load operation in some cases. When the internal combustion engine is operated at the high load, then the temperature of the SCR catalyst is raised, and $NH_3$, which has been adsorbed by the SCR catalyst, is sometimes released. Further, if the operation period at the theoretical air-fuel ratio is prolonged, then $NH_3$ cannot be produced by the three-way catalyst and the NSR catalyst, and hence it is impossible to supply $NH_3$ to the SCR catalyst. In this situation, when the air-fuel ratio is switched from the theoretical air-fuel ratio to the lean air-fuel ratio, it may be difficult to purify NOx due to the shortage of the reducing agent in the SCR catalyst. In this context, when the operation is performed at the theoretical air-fuel ratio, NOx is released from the NSR catalyst. Therefore, NOx can be occluded in the NSR catalyst after the operation is switched from the operation at the theoretical air-fuel ratio to the operation at the lean air-fuel ratio. However, it is feared that a part of NOx may flow out from the NSR catalyst without being occluded by the NSR catalyst depending on the operation state of the internal combustion engine. In such a situation, if NOx cannot be purified by the SCR catalyst, it is feared that the NOx purification rate of the entire system may be lowered. Therefore, when the operation is transferred to the operation at the lean air-fuel ratio after the operation is performed at the theoretical air-fuel ratio, it is desirable to promptly supply $NH_3$ to the SCR catalyst.

On the contrary, it is conceived that $NH_3$ is produced by the NSR catalyst when the operation is switched from the operation at the theoretical air-fuel ratio to the operation at the lean air-fuel ratio. That is, it is conceived that the rich spike is carried out in order to produce $NH_3$ by the NSR catalyst. However, NOx is released from the NSR catalyst when the operation is performed at the theoretical air-fuel ratio. Therefore, the NOx occlusion amount of the NSR catalyst is decreased when the air-fuel ratio is switched to the lean air-fuel ratio, and it becomes difficult to produce $NH_3$ by the NSR catalyst in some cases. On the other hand, even when $NH_3$ is produced by the three-way catalyst, if oxygen exists in the NSR catalyst, then it is feared that $NH_3$, which is produced by the three-way catalyst, is consequently reacted with oxygen in the NSR catalyst, and $NH_3$ does not arrive at the SCR catalyst. Therefore, it is feared that $NH_3$ cannot be supplied to the SCR catalyst immediately.

PRIOR ART LITERATURE

Patent Literature

Patent Literature 1: Japanese Patent No. 5534020

SUMMARY OF THE INVENTION

Problems to be Solved by the Invention

The present invention has been made taking the foregoing problems into consideration, an object of which is to promptly supply $NH_3$ to an SCR catalyst when the air-fuel ratio of an internal combustion engine is switched from the theoretical air-fuel ratio to the lean air-fuel ratio.

Means for Solving the Problems

In order to solve the problems as described above, there is provided an exhaust gas purification apparatus for an internal combustion engine; comprising a three-way catalyst which is provided for an exhaust gas passage of the internal combustion engine, which has an ability to store oxygen, and which produces $NH_3$ when an air-fuel ratio of an exhaust gas is lower than a theoretical air-fuel ratio; a storage reduction NOx catalyst which is provided for the exhaust gas passage downstream from the three-way catalyst, which has an ability to store oxygen, which is a catalyst to occlude NOx when the air-fuel ratio of the exhaust gas is a lean air-fuel ratio, and which reduces NOx occluded by the catalyst when the air-fuel ratio of the exhaust gas is not more than the theoretical air-fuel ratio; a selective catalytic reduction NOx catalyst which is provided for the exhaust gas passage downstream from the storage reduction NOx catalyst and which reduces NOx by using $NH_3$ as a reducing agent; and a controller comprising at least one processor configured to adjust the air-fuel ratio in the internal combustion engine, wherein: the controller farther configured to:

estimate a NOx occlusion amount of the storage reduction NOx catalyst; estimate an $NH_3$ adsorption amount of the selective catalytic reduction NOx catalyst; and operate such that the air-fuel ratio is set to a first air-fuel ratio which is lower than the theoretical air-fuel ratio during a period corresponding to an oxygen storage amount of the three-way catalyst and the storage reduction NOx catalyst before the air-fuel ratio in the internal combustion engine is switched from the theoretical air-fuel ratio to the lean air-fuel ratio; the air-fuel ratio in the internal combustion engine is set to a second air-fuel ratio which is higher than the first air-fuel ratio and which is lower than the theoretical air-fuel ratio until the $NH_3$ adsorption amount, which is estimated by the controller, becomes a predetermined adsorption amount after the period corresponding to the oxygen storage amount is terminated if the NOx occlusion amount, which is estimated by the controller, is less than an occlusion amount threshold value at a point in time at which the period corresponding to the oxygen storage amount is terminated; the air-fuel ratio is switched to the lean air-fuel ratio if the $NH_3$ adsorption amount, which is estimated by the controller, becomes the predetermined adsorption amount; the air-fuel ratio in the internal combustion engine is set to a third air-fuel ratio which is higher than the first air-fuel ratio and which is lower than the second air-fuel ratio until the $NH_3$ adsorption amount, which is estimated by the controller, becomes the predetermined adsorption amount after the period corresponding to the oxygen storage amount is terminated if the NOx occlusion amount, which is estimated by the controller, is not less than the occlusion amount threshold value at the point in time at which the period corresponding to the oxygen storage amount is terminated; and the air-fuel ratio is switched to the lean air-fuel ratio if the $NH_3$ adsorption amount, which is estimated by the controller, becomes the predetermined adsorption amount.

The controller once sets the air-fuel ratio to the rich air-fuel ratio before the air-fuel ratio in the internal combustion engine is switched from the theoretical air-fuel ratio to the lean air-fuel ratio. Specifically, the air-fuel ratio is switched from the theoretical air-fuel ratio to the first air-fuel ratio, the air-fuel ratio is thereafter switched to the second air-fuel ratio or the third air-fuel ratio, and then the air-fuel ratio is further switched to the lean air-fuel ratio. In the beginning, the air-fuel ratio is set to the first air-fuel ratio which is the rich air-fuel ratio, and oxygen is promptly released. The first air-fuel ratio is set to the air-fuel ratio which is lower than the second air-fuel ratio and the third air-fuel ratio described later on, in order to promptly release oxygen stored in the three-way catalyst and the NSR catalyst. That is, the lower the air-fuel ratio is, the more quickly oxygen can be released from the three-way catalyst and the NSR catalyst. Then, the air-fuel ratio is thereafter transferred or converted to the second air-fuel ratio or the third air-fuel ratio in order to produce $NH_3$, and $NH_3$ is supplied to the SCR catalyst.

In this context, the appropriate air-fuel ratio differs between the case in which $NH_3$ is produced by the NSR catalyst and the case in which $NH_3$ is produced by the three-way catalyst. If the NOx occlusion amount of the NSR catalyst is not less than the occlusion amount threshold value, $NH_3$ can be produced by utilizing the NSR catalyst. In this case, the air-fuel ratio is set to the third air-fuel ratio. On the other hand, if the NOx occlusion amount of the NSR catalyst is less than the occlusion amount threshold value, $NH_3$ is produced by the three-way catalyst. In this case, the air-fuel ratio is set to the second air-fuel ratio. The occlusion amount threshold value referred to herein is the NOx occlusion amount which makes it possible to produce a sufficient amount of $NH_3$ by means of the NSR catalyst. That is, the occlusion amount threshold value is the NOx occlusion amount which is required to produce $NH_3$ in such an amount that NOx can be purified in the SCR catalyst.

If the NOx occlusion amount of the NSR catalyst is not less than the occlusion amount threshold value, $NH_3$ can be produced by utilizing NOx. Therefore, if an air-fuel ratio, at which a larger amount of $H_2$ is contained, is established, it is possible to produce a larger amount of $NH_3$ by means of the NSR catalyst. Therefore, the third air-fuel ratio is such an air-fuel ratio that $H_2$ is contained in a large amount in the exhaust gas. On the other hand, if the NOx occlusion amount of the NSR catalyst is less than the occlusion amount threshold value, $H_2$ and NOx are reacted in the three-way catalyst to produce $NH_3$. Therefore, the second air-fuel ratio is such an air-fuel ratio that NOx and $H_2$ are contained in the exhaust gas. As a result, the second air-fuel ratio is higher than the third air-fuel ratio. As described above, the first air-fuel ratio is the air-fuel ratio which is appropriate to release oxygen from the three-way catalyst and the NSR catalyst as compared with the second air-fuel ratio or the third air-fuel ratio. The second air-fuel ratio is the air-fuel ratio which is appropriate to produce $NH_3$ in the three-way catalyst as compared with the third air-fuel ratio. The third air-fuel ratio is the air-fuel ratio which is appropriate to produce $NH_3$ in the NSR catalyst as compared with the second air-fuel ratio.

Thus, even if it is difficult to produce $NH_3$ in the NSR catalyst because NOx is released from the NSR catalyst and the NOx occlusion amount of the NSR catalyst is small when the air-fuel ratio in the internal combustion engine is the theoretical air-fuel ratio, then it is possible to produce $NH_3$ by means of the three-way catalyst by setting the air-fuel ratio to the second air-fuel ratio. In this situation, NOx is not occluded by the NSR catalyst. Therefore, $NH_3$ is not consumed by the NSR catalyst as well. On this account, $NH_3$ can be promptly supplied to the SCR catalyst. Note that the predetermined adsorption amount is such an $NH_3$ adsorption amount that NOx can be purified by the SCR catalyst even when the air-fuel ratio is switched to the lean air-fuel ratio. Therefore, the occlusion amount threshold value described above can be also the NOx occlusion amount with which the $NH_3$ adsorption amount of the SCR catalyst can be the predetermined adsorption amount. Further, the period corresponding to the oxygen storage amount of the three-way catalyst and the storage reduction NOx catalyst is the period in which it is possible to assume that the release of oxygen from the three-way catalyst and the NSR catalyst is completed. The completion of the release of oxygen includes the fact that the amount of oxygen stored in the three-way catalyst and the NSR catalyst is zero. However, the completion of the release of oxygen can also include such a case that the influence exerted on the production of $NH_3$ is within an allowable range, although the amount of oxygen stored in the three-way catalyst and the NSR catalyst is not strictly zero.

In another viewpoint, the second air-fuel ratio may be such an air-fuel ratio that an amount of production of $NH_3$ is increased in the three-way catalyst as compared with the third air-fuel ratio, if the NOx occlusion amount, which is estimated by the controller, is less than the occlusion amount threshold value at the point in time at which the period corresponding to the oxygen storage amount is terminated.

That is, it is possible to produce a large amount of $NH_3$ in the three-way catalyst by setting the air-fuel ratio of the internal combustion engine to the second air-fuel ratio as compared with the setting to the third air-fuel ratio, if the NOx occlusion amount of the NSR catalyst is less than the occlusion amount threshold value. Accordingly, even if the NOx occlusion amount of the NSR catalyst is less than the occlusion amount threshold value, it is possible to supply $NH_3$ to the SCR catalyst more promptly. Note that the second air-fuel ratio may be such an air-fuel ratio that the amount of production of $NH_3$ in the three-way catalyst is maximized.

In another viewpoint, the exhaust gas purification apparatus for the internal combustion engine may further comprise an air-fuel ratio sensor which detects the air-fuel ratio of the exhaust gas at the exhaust gas passage downstream from the storage reduction NOx catalyst and upstream from the selective catalytic reduction NOx catalyst; wherein the controller can switch the air-fuel ratio to the second air-fuel ratio or the third air-fuel ratio assuming that the period corresponding to the oxygen storage amount is terminated, if the air-fuel ratio, which is detected by the air-fuel ratio sensor, is changed from the theoretical air-fuel ratio to a rich air-fuel ratio when the air-fuel ratio is set to the first air-fuel ratio.

When the release of oxygen from the three-way catalyst and the NSR catalyst is completed in accordance with the setting to the first air-fuel ratio, the air-fuel ratio of the exhaust gas outflowing from the NSR catalyst is changed from the theoretical air-fuel ratio to the rich air-fuel ratio. On this account, when the detection value of the air-fuel ratio sensor is changed from the theoretical air-fuel ratio to the rich air-fuel ratio, the air-fuel ratio can be switched from the first air-fuel ratio to the second air-fuel ratio or the third air-fuel ratio. That is, the point in time, at which the air-fuel ratio detected by the air-fuel ratio sensor is changed from the theoretical air-fuel ratio to the rich air-fuel ratio, is the point in time at which the period corresponding to the oxygen storage amount of the three-way catalyst and the storage reduction NOx catalyst described above comes to an end.

In another viewpoint, the exhaust gas purification apparatus for the internal combustion engine may further comprise an air-fuel ratio sensor which detects the air-fuel ratio of the exhaust gas at the exhaust gas passage downstream from the storage reduction NOx catalyst and upstream from the selective catalytic reduction NOx catalyst; wherein the controller can estimate the oxygen storage amount of the three-way catalyst and the storage reduction NOx catalyst; the controller can switch the air-fuel ratio from the first air-fuel ratio to the second air-fuel ratio or the third air-fuel ratio if the oxygen storage amount, which is estimated by the controller, is not more than a predetermined storage amount when the air-fuel ratio is set to the first air-fuel ratio; and the controller can correct the oxygen storage amount which is estimated by the controller or the predetermined storage amount so that the oxygen storage amount, which is estimated by the controller at a point in time at which the air-fuel ratio detected by the air-fuel ratio sensor is changed from the theoretical air-fuel ratio to a rich air-fuel ratio, is equal to the predetermined storage amount.

If the oxygen storage amount of the three-way catalyst and the NSR catalyst is estimated, it is possible to determine the timing at which the air-fuel ratio is switched from the first air-fuel ratio to the second air-fuel ratio or the third air-fuel ratio, on the basis of the estimated oxygen storage amount. In this case, the point in time, at which the oxygen storage amount estimated by the controller is not more than the predetermined storage amount, is the point in time at which the period corresponding to the oxygen storage amount of the three-way catalyst and the NSR catalyst described above comes to an end. However, the estimated oxygen storage amount is deviated from the actual oxygen storage amount in some cases due to the deterioration and/or the individual difference of the three-way catalyst or the NSR catalyst. On the other hand, if the air-fuel ratio of the exhaust gas is detected by the air-fuel ratio sensor, it is possible to know the actual timing at which the release of oxygen from the three-way catalyst and the NSR catalyst is completed. Then, if the point in time, at which the detection value of the air-fuel ratio sensor is changed from the theoretical air-fuel ratio to the rich air-fuel ratio, is deviated from the point in time at which the oxygen storage amount estimated by the controller is not more than the predetermined storage amount, it is considered that the oxygen storage amount estimated by the controller is deviated from the actual oxygen storage amount. Therefore, the estimated oxygen storage amount or the predetermined storage amount is corrected so that the timing, at which the estimated oxygen storage amount is equal to the predetermined storage amount, is equal to the actual timing acquired by the air-fuel ratio sensor at which the release of oxygen from the three-way catalyst and the NSR catalyst is completed. Accordingly, the air-fuel ratio can be switched from the first air-fuel ratio to the second air-fuel ratio or the third air-fuel ratio next time and thereafter at the more appropriate timing on the basis of the estimated oxygen storage amount. Note that the predetermined storage amount is the oxygen storage amount at which it is possible to assume that the release of oxygen from the three-way catalyst and the NSR catalyst is completed. In this procedure, when the timing, at which the air-fuel ratio is switched from the first air-fuel ratio to the second air-fuel ratio or the third air-fuel ratio, is determined, it is also allowable that the oxygen storage amount estimated by the controller and the detection value of the air-fuel ratio sensor are used in combination. In this case, the air-fuel ratio may be switched from the first air-fuel ratio to the second air-fuel ratio or the third air-fuel ratio at an earlier point in time of any one of the point in time at which the oxygen storage amount estimated by the controller is not more than the predetermined storage amount and the point in time at which the detection value of the air-fuel ratio sensor is changed to the rich air-fuel ratio.

In another viewpoint, the controller may switch the air-fuel ratio to the lean air-fuel ratio without providing the first air-fuel ratio and the second air-fuel ratio or the third air-fuel ratio if the $NH_3$ adsorption amount, which is estimated by the controller, is not less than an adsorption amount threshold value before the air-fuel ratio in the internal combustion engine is switched from the theoretical air-fuel ratio to the lean air-fuel ratio.

If a sufficient amount of $NH_3$ is adsorbed by the SCR catalyst, it is unnecessary to newly adsorb $NH_3$ to the SCR catalyst. Therefore, the air-fuel ratio can be promptly transferred to the lean air-fuel ratio. Accordingly, it is possible to reduce the fuel consumption amount. The adsorption amount threshold value is the $NH_3$ adsorption amount with which NOx can be purified by the SCR catalyst. The adsorption amount threshold value may be either the same value as that of the predetermined adsorption amount described above or any different value.

Advantageous Effect of the Invention

According to the present invention, $NH_3$ can be promptly supplied to the SCR catalyst when the air-fuel ratio of the internal combustion engine is switched from the theoretical air-fuel ratio to the lean air-fuel ratio. Accordingly, the air-fuel ratio can be promptly transferred to the lean air-fuel ratio.

BRIEF DESCRIPTION OF THE DRAWINGS

FIG. 1 shows a schematic arrangement of an internal combustion engine according to an embodiment and an intake system and an exhaust system thereof.

FIG. 2 shows a time chart illustrating the transition of the target air-fuel ratio and the estimated value of the oxygen storage amount when the rich spike is carried out when the operation is transferred from the operation at the theoretical air-fuel ratio to the operation at the lean air-fuel ratio.

FIG. 3 shows a flow chart illustrating a flow of the air-fuel ratio control to be performed when the operation is transferred from the operation at the theoretical air-fuel ratio to the operation at the lean air-fuel ratio according to a first embodiment.

FIG. 4 shows a flow chart illustrating a flow of the air-fuel ratio control to be performed when the operation is transferred from the operation at the theoretical air-fuel ratio to the operation at the lean air-fuel ratio according to the first embodiment.

FIG. 5 shows a time chart illustrating the transition of the target air-fuel ratio, the estimated value of the oxygen storage amount, the air-fuel ratio of the exhaust gas outflowing from the three-way catalyst, and the air-fuel ratio of the exhaust gas outflowing from the NSR catalyst, when the rich spike is carried out when the operation is transferred from the operation at the theoretical air-fuel ratio to the operation at the lean air-fuel ratio.

FIG. 6 shows a flow chart illustrating a flow of the air-fuel ratio control to be performed when the operation is transferred from the operation at the theoretical air-fuel ratio to the operation at the lean air-fuel ratio according to a second embodiment.

FIG. 7 shows a flow chart illustrating a flow of the air-fuel ratio control to be performed when the operation is transferred from the operation at the theoretical air-fuel ratio to the operation at the lean air-fuel ratio according to a third embodiment.

FIG. 8 shows a flow chart illustrating a flow of the air-fuel ratio control to be performed when the operation is transferred from the operation at the theoretical air-fuel ratio to the operation at the lean air-fuel ratio according to a fourth embodiment.

EMBODIMENTS FOR CARRYING OUT THE INVENTION

An explanation will be made in detail below by way of example with reference to the drawings on the basis of an embodiment about a mode for carrying out the present invention. However, for example, the dimension or size, the material, the shape, and the relative arrangement of each of constitutive parts or components described in the embodiment are not intended to limit the scope of the invention only thereto unless specifically noted.

First Embodiment

FIG. 1 shows a schematic arrangement of an internal combustion engine according to this embodiment and an intake system and an exhaust system thereof. The internal combustion engine 1 shown in FIG. 1 is a gasoline engine. However, the internal combustion engine 1 may be a diesel engine. The internal combustion engine 1 is carried, for example, on a vehicle.

An exhaust gas passage 2 is connected to the internal combustion engine 1. A three-way catalyst 3, a storage reduction NOx catalyst 4 (hereinafter referred to as "NSR catalyst 4"), and a selective catalytic reduction NOx catalyst 5 (hereinafter referred to as "SCR catalyst 5") are provided in this order from the upstream side at intermediate positions of the exhaust gas passage 2.

The three-way catalyst 3 purifies NOx, HC, and CO when the catalyst atmosphere resides in the theoretical air-fuel ratio. Further, the three-way catalyst 3 has an ability to store oxygen (oxygen storage ability). That is, oxygen, which corresponds to an excessive amount, is stored when the air-fuel ratio of the exhaust gas inflowing into the three-way catalyst 3 is the lean air-fuel ratio, while oxygen, which corresponds to a shortage amount, is released when the air-fuel ratio of the exhaust gas inflowing into the three-way catalyst 3 is the rich air-fuel ratio. Thus, the catalyst atmosphere is maintained to be at the theoretical air-fuel ratio. Owing to the action of the oxygen storage ability as described above, the three-way catalyst 3 can purify HC, CO, and NOx, even when the air-fuel ratio of the exhaust gas inflowing into the three-way catalyst 3 is any air-fuel ratio other than the theoretical air-fuel ratio.

The NSR catalyst 4 occludes NOx contained in the exhaust gas when the oxygen concentration of the inflowing exhaust gas is high, while the NSR catalyst 4 reduces NOx having been occluded when the oxygen concentration of the inflowing exhaust gas is lowered and any reducing agent is present. HC or CO, which is unburned fuel discharged from the internal combustion engine 1, can be utilized for the reducing agent to be supplied to the NSR catalyst 4. Then, the NSR catalyst 4 also has an oxygen storage ability.

In this context, in the three-way catalyst 3, NOx contained in the exhaust gas is reacted with HC or $H_2$ to produce ammonia ($NH_3$) in some cases. Further, in the NSR catalyst 4, NOx occluded by the NSR catalyst 4 is reacted with HC or $H_2$ contained in the exhaust gas to produce $NH_3$ in some cases. For example, when $H_2$ is produced in accordance with the water gas shift reaction or the steam reforming reaction from CO and $H_2O$ produced by the combustion of the fuel, $H_2$ is reacted with NO in the three-way catalyst 3 or the NSR catalyst 4 to produce $NH_3$. Then, the following tendency occurs. That is, the lower the air-fuel ratio of the internal combustion engine 1 is, the larger the amount of $H_2$ inflowing into the three-way catalyst 3 or the NSR catalyst 4 is.

The SCR catalyst 5 adsorbs the reducing agent beforehand, and NOx is selectively reduced by using the reducing agent. $NH_3$, which is produced by the three-way catalyst 3 or the NSR catalyst 4, can be utilized for the reducing agent to be supplied to the SCR catalyst 5.

Further, a first air-fuel ratio sensor 11, which detects the air-fuel ratio of the exhaust gas, is attached to the exhaust gas passage 2 upstream from the three-way catalyst 3. Further, a second air-fuel ratio sensor 12 which detects the air-fuel ratio of the exhaust gas and a first NOx sensor 21 which detects the NOx concentration in the exhaust gas are attached to the exhaust gas passage 2 downstream from the three-way catalyst 3 and upstream from the NSR catalyst 4. Any member, which changes the air-fuel ratio, does not exist in the exhaust gas passage 2 in the region ranging from the internal combustion engine 1 to the first air-fuel ratio sensor 11. Therefore, it is possible to detect the air-fuel ratio in the internal combustion engine 1 or the air-fuel ratio of the exhaust gas inflowing into the three-way catalyst 3 by means of the first air-fuel ratio sensor 11. On the other hand, it is possible to detect the air-fuel ratio of the exhaust gas outflowing from the three-way catalyst 3 or the air-fuel ratio of the exhaust gas inflowing into the NSR catalyst 4 by means of the second air-fuel ratio sensor 12. Further, it is possible to detect the NOx concentration in the exhaust gas outflowing from the three-way catalyst 3 or the NOx concentration in the exhaust gas inflowing into the NSR catalyst 4 by means of the first NOx sensor 21.

A third air-fuel ratio sensor 13 which detects the air-fuel ratio of the exhaust gas and a second NOx sensor 22 which detects the NOx concentration in the exhaust gas are attached to the exhaust gas passage 2 downstream from the NSR catalyst 4 and upstream from the SCR catalyst 5. It is possible to detect the air-fuel ratio of the exhaust gas outflowing from the NSR catalyst 4 or the air-fuel ratio of the exhaust gas inflowing into the SCR catalyst 5 by means of the third air-fuel ratio sensor 13. On the other hand, it is possible to detect the NOx concentration in the exhaust gas outflowing from the NSR catalyst 4 or the NOx concentration in the exhaust gas inflowing into the SCR catalyst 5 by means of the second NOx sensor 22. Note that in this embodiment, the third air-fuel ratio sensor 13 corresponds to the air-fuel ratio sensor according to the present invention. Further, a fourth air-fuel ratio sensor 14, which detects the air-fuel ratio of the exhaust gas, is attached to the exhaust gas passage 2 downstream from the SCR catalyst 5. It is possible to detect the air-fuel ratio of the exhaust gas outflowing from the SCR catalyst 5 by means of the fourth air-fuel ratio sensor 14.

Note that the second air-fuel ratio sensor 12 and the first NOx sensor 21 may be integrated into one sensor. Further, the third air-fuel ratio sensor 13 and the second NOx sensor 22 may be integrated into one sensor.

An injection valve 6, which supplies the fuel to the internal combustion engine 1, is provided for the internal combustion engine 1. Further, an intake gas passage 7 is connected to the internal combustion engine 1. A throttle 8, which adjusts the intake air amount of the internal combustion engine 1, is provided at an intermediate position of the intake gas passage 7. An air flow meter 15, which detects the intake air amount of the internal combustion engine 1, is attached to the intake gas passage 7 upstream from the throttle 8. The injection valve 6 may directly inject the fuel into the cylinder of the internal combustion engine 1. Alternatively, the injection valve 6 may inject the fuel into the intake gas passage 7 or an intake port (not shown).

ECU 10, which is an electronic control unit (controller) to control the internal combustion engine 1, is provided in combination with the internal combustion engine 1 constructed as described above. ECU 10 controls the internal combustion engine 1 in accordance with the operation condition of the internal combustion engine 1 and/or a request of a driver.

Further, other than the sensors described above, those connected to ECU 10 via electric wirings are an accelerator opening degree sensor 17 which outputs an electric signal corresponding to the pedaling amount of an accelerator pedal 16 pedaled by the driver so that the engine load is detected, and a crank position sensor 18 which detects the engine rotation speed. Output signals of the various sensors are inputted into ECU 10. On the other hand, the injection valve 6 and the throttle 8 are connected to ECU 10 via electric wirings. These apparatuses are controlled by ECU 10.

For example, ECU 10 determines the requested intake air amount from the accelerator opening degree detected by the accelerator opening degree sensor 17 and the engine rotation speed detected by the crank position sensor 18. Then, the opening degree of the throttle 8 is controlled so that the intake air amount, which is detected by the air flow meter 15, is the requested intake air amount. ECU 10 controls the injection valve 6 so that the fuel amount, which corresponds to the intake air amount changed in this situation, is supplied. The air-fuel ratio, which is set in this situation, is the air-fuel ratio which is set in accordance with the operation state of the internal combustion engine 1. Then, in this embodiment, ECU 10 operates the internal combustion engine 1 at the lean air-fuel ratio. However, ECU 10 operates the internal combustion engine 1 at the theoretical air-fuel ratio, for example, during the cold start or during the high load operation of the internal combustion engine 1. The injection valve 6 or the throttle 8 is controlled so that the air-fuel ratio of the air-fuel mixture is, for example, 24 during the operation at the lean air-fuel ratio. Further, the injection valve 6 and the throttle 8 is controlled so that the air-fuel ratio of the air-fuel mixture is, for example, 14.7 during the operation at the theoretical air-fuel ratio.

Then, ECU 10 carries out the reduction process for NOx occluded by the NSR catalyst 4. The so-called rich spike, in which the air-fuel ratio of the exhaust gas inflowing into the NSR catalyst 4 is temporarily lowered to the rich air-fuel ratio, is carried out by adjusting the amount of the fuel injected from the injection valve 6 or the opening degree of the throttle 8 during the reduction of NOx occluded by the NSR catalyst 4.

The rich spike is carried out, for example, when the NOx amount occluded by the NSR catalyst 4 becomes the upper limit threshold value. The NOx occlusion amount of the NSR catalyst 4 is calculated, for example, by adding up the differences between the NOx amount inflowing into the NSR catalyst 4 and the NOx amount outflowing from the NSR catalyst 4 after carrying out the rich spike last time. The NOx amount inflowing into the NSR catalyst 4 and the NOx amount outflowing from the NSR catalyst 4 can be acquired on the basis of the detection values of the first NOx sensor 21, the second NOx sensor 22, and the air flow meter 15. Further, the rich spike may be performed depending on the travel distance of the vehicle which carries the internal combustion engine 1. Further, the NOx occlusion amount, which decreases during the rich spike, is relevant to the temperature of the NSR catalyst 4, the detection value of the air flow meter 5, and the air-fuel ratio of the exhaust gas. Therefore, the relationship among them can be previously acquired, for example, by means of any experiment or any simulation. It is possible to calculate the NOx occlusion amount which decreases during the rich spike, on the basis of the relationship. The NOx occlusion amount of the NSR catalyst 4 may be calculated by means of any other well-known method, without being limited to the method described above. Note that in this embodiment, ECU 10 calculates the NOx occlusion amount of the NSR catalyst 4, and thus ECU 10 functions as the controller according to the present invention. The NOx occlusion amount, which is calculated by ECU 10, is hereinafter referred to as "estimated NOx occlusion amount" as well.

Further, ECU 10 allows the three-way catalyst 3 or the NSR catalyst 4 to produce $NH_3$ by carrying out the rich spike. The rich spike is carried out if the $NH_3$ amount adsorbed by the SCR catalyst 5 is decreased to the lower limit threshold value when the internal combustion engine 1 is operated at the lean air-fuel ratio. Alternatively, the rich spike may be carried out at predetermined intervals. The method for estimating the $NH_3$ adsorption amount of the SCR catalyst 5 will be described later on.

Further, ECU 10 switches the operation from the operation at the theoretical air-fuel ratio to the operation at the lean air-fuel ratio, and ECU 10 also carries out the rich spike in this situation. That is, the air-fuel ratio is transferred from the theoretical air-fuel ratio via the rich air-fuel ratio to the lean air-fuel ratio, without directly transferring the air-fuel ratio from the theoretical air-fuel ratio to the lean air-fuel ratio. Note that in this embodiment, ECU 10 adjusts the air-fuel ratio, and thus ECU 10 functions as the controller according to the present invention.

In this procedure, the rich spike is not carried out during the operation at the theoretical air-fuel ratio, because NOx can be purified by the three-way catalyst 3. Therefore, $NH_3$ is hardly produced by the NSR catalyst 4. On this account, $NH_3$ is hardly supplied to the SCR catalyst 5 during the operation at the theoretical air-fuel ratio. Further, if the air-fuel ratio of the exhaust gas is the theoretical air-fuel ratio, NOx is consequently released from the NSR catalyst 4. Therefore, even if it is intended to produce $NH_3$ when the operation at the theoretical air-fuel ratio comes to an end, then it is difficult to produce $NH_3$ by the NSR catalyst 4 in some cases. Further, NOx, which is released from the NSR catalyst 4, is reduced by the SCR catalyst 5. Therefore, the $NH_3$ adsorption amount of the SCR catalyst 5 is decreased. Then, if the air-fuel ratio is transferred to the lean air-fuel ratio in this state, it is feared that $NH_3$ may be in shortage in the SCR catalyst 5 and it may be difficult to purify NOx. As described above, when NOx cannot be purified by the SCR catalyst 5, NOx is to be purified by means of only the three-way catalyst 3 and the NSR catalyst 4. Therefore, if such a state arises that NOx cannot be purified by the three-way catalyst 3 and the NSR catalyst 4, or if such a state arises that NOx is released from the NSR catalyst 4, then it is feared that the NOx purification rate may be lowered as the entire system.

In view of the above, in this embodiment, the rich spike is carried out before switching the operation to the operation at the lean air-fuel ratio after the operation at the theoretical air-fuel ratio, and the air-fuel ratio during the rich spike is changed at the two stages. In this embodiment, the air-fuel ratio is firstly set to the first air-fuel ratio, and then the air-fuel ratio is set to the second air-fuel ratio or the third air-fuel ratio. In this procedure, oxygen is released from the catalyst during the rich spike and the catalyst atmosphere resides in the theoretical air-fuel ratio during the period in which oxygen is stored in the three-way catalyst 3 or the NSR catalyst 4. On this account, it is impossible to produce $NH_3$. Further, even when oxygen is not stored in the three-way catalyst 3, when oxygen is stored in the NSR catalyst 4, even if $NH_3$ is produced by the three-way catalyst 3, then $NH_3$ is oxidized by oxygen occluded in the NSR catalyst 4 disposed downstream. On this account, $NH_3$ does not arrive at the SCR catalyst 5. Therefore, in the beginning, the air-fuel ratio is set to the first air-fuel ratio which is the relatively low air-fuel ratio in order to promptly release oxygen stored in the three-way catalyst 3 and the NSR catalyst 4. The first air-fuel ratio is, for example, 12.5. The first air-fuel ratio is the air-fuel ratio which is lower than the air-fuel ratio that is appropriate to reduce NOx occluded by the NSR catalyst 4.

In this procedure, the lower the first air-fuel ratio is, the more promptly oxygen is released from the three-way catalyst 3 and the NSR catalyst 4. However, the HC amount, which passes through the both catalysts, is increased. On this account, the lower limit of the first air-fuel ratio is established so that the HC amount outflowing from the NSR catalyst 4 is within an allowable range. The allowable range may be determined on the basis of the requested emission performance of the requested fuel efficiency (fuel consumption). The first air-fuel ratio may be acquired, for example, by means of any experiment or any simulation.

Then, if such a state arises that no oxygen is assumed to be stored in the three-way catalyst 3 and the NSR catalyst 4, the air-fuel ratio is switched from the first air-fuel ratio to the second air-fuel ratio or the third air-fuel ratio. The second air-fuel ratio and the third air-fuel ratio are the air-fuel ratios which are higher than the first air-fuel ratio and which are lower than the theoretical air-fuel ratio. To which one of the second air-fuel ratio and the third air-fuel ratio the air-fuel ratio is to be switched depends on the NOx occlusion amount of the NSR catalyst 4. That is, if the estimated NOx occlusion amount, which is provided at the point in time at which the operation at the first air-fuel ratio is terminated, is less than the occlusion amount threshold value, the second air-fuel ratio is selected. If the estimated NOx occlusion amount is not less than the occlusion amount threshold value, the third air-fuel ratio is selected. The second air-fuel ratio is the air-fuel ratio which is higher than the third air-fuel ratio. Further, the second air-fuel ratio is such an air-fuel ratio that the production amount of $NH_3$ is increased in the three-way catalyst 3 as compared with a case in which the third air-fuel ratio is selected, if the NOx occlusion amount of the NSR catalyst 4 is less than the occlusion amount threshold value at the point in time at which the operation at the first air-fuel ratio is terminated. The occlusion amount threshold value is the NOx occlusion amount which makes it possible to produce a sufficient amount of $NH_3$ by means of the NSR catalyst. That is, the occlusion amount threshold value is the NOx occlusion amount which is required to produce $NH_3$ in an amount capable of purifying NOx in the SCR catalyst 5 after the air-fuel ratio is switched to the lean air-fuel ratio. Further, the second air-fuel ratio is the air-fuel ratio which is appropriate to produce $NH_3$ in the three-way catalyst 3, and the third air-fuel ratio is the air-fuel ratio which is appropriate to produce $NH_3$ in the NSR catalyst 4. The second air-fuel ratio and the third air-fuel ratio are consequently the air-fuel ratios which are higher than the first air-fuel ratio and lower than the theoretical air-fuel ratio. Then, the operation is performed at the second air-fuel ratio or the third air-fuel ratio, and then the air-fuel ratio is switched to the lean air-fuel ratio. The second air-fuel ratio and the third air-fuel ratio will be explained below.

The second air-fuel ratio may be such an air-fuel ratio that the production amount of $NH_3$ in the three-way catalyst 3 is maximized provided that the conditions other than the air-fuel ratio are identical. In this case, it is also affirmed that the first air-fuel ratio is the air-fuel ratio which is lower than the air-fuel ratio at which the production amount of $NH_3$ is maximized. When the operation is performed at the second air-fuel ratio, then $NH_3$ produced by the three-way catalyst 3 passes through the NSR catalyst 4 without being reacted in the NSR catalyst 4, and $NH_3$ arrives at the SCR catalyst 5, because no oxygen is stored in the NSR catalyst 4. In this situation, NOx is released from the NSR catalyst 4 during the operation at the theoretical air-fuel ratio before performing the operation at the second air-fuel ratio, and hence NOx is hardly occluded in the NSR catalyst 4. Further, NOx, which is discharged from the internal combustion engine 1 when the operation is performed at the second air-fuel ratio, is also consumed when $NH_3$ is produced by the three-way catalyst 3, and hence NOx is hardly supplied to the NSR catalyst 4. That is, NOx is hardly occluded in the NSR catalyst 4 during the operation at the second air-fuel ratio, and NOx is not supplied to the NSR catalyst 4 as well. Therefore, it is difficult to produce $NH_3$ in the NSR catalyst 4. On the other hand, $NH_3$ can be produced by utilizing NOx contained in the exhaust gas in the three-way catalyst 3 even during the operation at the second air-fuel ratio. Note that the three-way catalyst 3 is provided on the upstream side of the exhaust gas passage 2 as compared with the NSR catalyst 4, and hence the three-way catalyst 3 has a higher temperature. On this account, the reactivity of NOx is high in the three-way catalyst 3 as compared with the NSR catalyst 4. Therefore, it is advantageous to produce $NH_3$ in the three-way catalyst 3.

The second air-fuel ratio is such an air-fuel ratio that NOx and $H_2$ are appropriately present in the exhaust gas, and the second air-fuel ratio is, for example, 14.0. In this procedure, the lower the air-fuel ratio in the cylinder is, the more increased the production amount of $H_2$ is. However, the production amount of NOx is decreased. Therefore, when $NH_3$ is produced from NOx and $H_2$ in the three-way catalyst 3, then NOx is in shortage if the air-fuel ratio is excessively low, while $H_2$ is in shortage if the air-fuel ratio is excessively high. On this account, the production amount of $NH_3$ is maximized by reacting $H_2$ and NOx neither too much nor too little. Therefore, when the air-fuel ratio, at which the production amount of $NH_3$ is maximized in the three-way catalyst 3, is used as the second air-fuel ratio, it is thereby possible to more promptly increase the adsorption amount of $NH_3$ of the SCR catalyst 5. The second air-fuel ratio may be acquired, for example, by means of any experiment or any simulation.

On the other hand, when NOx, which is in an amount of not less than the occlusion amount threshold value, is occluded by the NSR catalyst 4, it is possible to produce $NH_3$ in the NSR catalyst 4 by utilizing NOx. In this case, it is unnecessary to discharge NOx from the internal combustion engine 1 in order to produce $NH_3$ in the three-way catalyst 3. That is, it is enough to discharge $H_2$ from the internal combustion engine 1 in order to produce $NH_3$ in the NSR catalyst 4. Therefore, if the third air-fuel ratio is set to such an air-fuel ratio that a larger amount of $H_2$ is produced as compared with the second air-fuel ratio, it is possible to further increase the reaction amount of NOx and $H_2$ per unit time. Accordingly, it is possible to more promptly increase the $NH_3$ adsorption amount of the SCR catalyst 5.

FIG. 2 shows a time chart illustrating the transition of the target air-fuel ratio (target A/F) and the estimated value of the oxygen storage amount when the rich spike is carried out when the operation is transferred from the operation at the theoretical air-fuel ratio to the operation at the lean air-fuel ratio. The oxygen storage amount is the total value of the amount of oxygen stored in the three-way catalyst 3 and the amount of oxygen stored in the NSR catalyst 4, and the oxygen storage amount is the value estimated by ECU 10.

T1 shows the point in time at which the target air-fuel ratio of the internal combustion engine 1 is switched from the theoretical air-fuel ratio to the first air-fuel ratio. T2 shows the point in time at which the target air-fuel ratio of the internal combustion engine 1 is switched from the first air-fuel ratio to the second air-fuel ratio or the third air-fuel ratio. T3 shows the point in time at which the target air-fuel ratio of the internal combustion engine 1 is switched from the second air-fuel ratio or the third air-fuel ratio to the lean air-fuel ratio.

In the operation of the internal combustion engine 1 at the theoretical air-fuel ratio before T1, the oxygen storage amount is maintained to be substantially constant. Note that even when the target air-fuel ratio is set to the theoretical air-fuel ratio, the actual air-fuel ratio may be varied in the vicinity of the theoretical air-fuel ratio. Then, oxygen is stored when the actual air-fuel ratio is higher than the theoretical air-fuel ratio, while oxygen is released when the actual air-fuel ratio is lower than the theoretical air-fuel ratio. Therefore, strictly speaking, the oxygen storage amount may be also varied. However, it is considered that the variation amount thereof is small. Therefore, it is possible to consider that the oxygen storage amount is substantially constant. Then, if the target air-fuel ratio is set to the first air-fuel ratio, oxygen is released from the three-way catalyst 3 and the NSR catalyst 4. Therefore, the oxygen storage amount is gradually decreased. If the oxygen storage amount becomes substantially zero, then the release of oxygen from the three-way catalyst 3 and the NSR catalyst 4 is completed, and hence the air-fuel ratio is switched to the second air-fuel ratio or the third air-fuel ratio. In the period ranging from T2 to T3, the solid line indicates the second air-fuel ratio which is appropriate to produce $NH_3$ in the three-way catalyst 3, and the broken line indicates the third air-fuel ratio which is appropriate to produce $NH_3$ in the NSR catalyst 4. Note that for the convenience of explanation, the point in time, at which both of the operations at the second air-fuel ratio and the third air-fuel ratio are terminated, is T3. However, the point in time, at which the operation at the second air-fuel ratio is terminated, is not necessarily the same as the point in time at which the operation at the third air-fuel ratio is terminated. Then, the target air-fuel ratio is switched from the second air-fuel ratio or the third air-fuel ratio to the lean air-fuel ratio at T3 as the point in time at which the $NH_3$ adsorption amount of the SCR catalyst 5 is sufficiently increased. Oxygen is supplied to the three-way catalyst 3 and the NSR catalyst 4 at the lean air-fuel ratio, and hence the oxygen storage amount is gradually increased.

The timing T1, at which the air-fuel ratio is switched from the theoretical air-fuel ratio to the first air-fuel ratio, is provided when it is unnecessary to perform the operation at the theoretical air-fuel ratio. For example, the timing T1 is provided when the warming-up of the internal combustion engine 1 is completed or when the load exerted on the internal combustion engine 1 is lowered to not more than a predetermined load. The predetermined load can be previously acquired as the upper limit value of the load at which the operation can be performed at the lean air-fuel ratio, for example, by means of any experiment or any simulation.

The timing T2, at which the air-fuel ratio is switched from the first air-fuel ratio to the second air-fuel ratio or the third air-fuel ratio, is provided when the release of oxygen from the three-way catalyst 3 and the NSR catalyst 4 is completed. Note that even when a small amount of oxygen is stored, it is also appropriate to deal with such a situation assuming that the release of oxygen is completed provided that the amount is small to such an extent that the amount is negligible. The oxygen storage amount, which is obtained when the operation is performed for a sufficiently long time at the theoretical air-fuel ratio, has a substantially constant value. Therefore, the oxygen storage amount can be previously acquired, for example, by means of any experiment or any simulation. On the other hand, ECU 10 estimates the oxygen storage amount of the three-way catalyst 3 and the NSR catalyst 4 after the air-fuel ratio is switched from the theoretical air-fuel ratio to the first air-fuel ratio. In this procedure, the oxygen storage amount of the three-way catalyst 3 and the NSR catalyst 4 is in the correlation with the air-fuel ratio and the added-up value of the intake air amounts. That is, the larger the added-up value of the intake air amounts is, the more quickly the oxygen storage amount is decreased, provided that the air-fuel ratio is identical when the operation is performed at the first air-fuel ratio. Further, the lower the air-fuel ratio is, the more quickly the oxygen storage amount is decreased, provided that the added-up value of the intake air amounts is identical. The first air-fuel ratio resides in the fixed value. Therefore, if the relationship between the added-up value of the intake air amounts and the oxygen storage amount of the three-way catalyst 3 and the NSR catalyst 4 is previously acquired, for example, by means of any experiment or any simulation, it is possible to acquire the oxygen storage amount of the three-way catalyst 3 and the NSR catalyst 4 from the added-up value of the intake air amounts. Then, the oxygen storage amount is calculated as required, after the target air-fuel ratio of the internal combustion engine 1 is switched from the theoretical air-fuel ratio to the first air-fuel ratio. When the oxygen storage amount becomes not more than a predetermined storage amount, the air-fuel ratio is switched to the second air-fuel ratio or the third air-fuel ratio. The predetermined storage amount is the oxygen storage amount at which it is possible to assume that the release of oxygen is completed. The predetermined storage amount may be zero. Note that in this embodiment, ECU 10 estimates the oxygen storage amount, and thus ECU 10 functions as the controller according to the present invention.

Note that the timing T2 may be acquired by comparing the added-up value of the intake air amounts with the threshold value, in place of such a procedure that the timing T2, at which the air-fuel ratio is switched to the second air-fuel ratio or the third air-fuel ratio, is acquired by comparing the oxygen storage amount with the predetermined storage amount. That is, the first air-fuel ratio is the fixed value. Therefore, the added-up value of the intake air amounts, which is provided when the oxygen storage amount is not more than the predetermined storage amount in a state in which the air-fuel ratio is fixed to the first air-fuel ratio, may be previously acquired, for example, by means of any experiment or any simulation, and the acquired added-up value, of the intake air amounts may be set as the threshold value. Then, the added-up value of the intake air amounts may be calculated as required after the target air-fuel ratio of the internal combustion engine 1 is switched from the theoretical air-fuel ratio to the first air-fuel ratio, and the air-fuel ratio may be switched to the second air-fuel ratio or the third air-fuel ratio if the added-up value is not less than the threshold value. Further, if the release of oxygen from the three-way catalyst 3 and the NSR catalyst 4 is completed, the air-fuel ratio of the exhaust gas outflowing from the NSR catalyst 4 is the rich air-fuel ratio. Therefore, the point in time, at which the detection value of the third air-fuel ratio sensor 13 is changed from the theoretical air-fuel ratio to the rich air-fuel ratio, may be the timing T2 at which the air-fuel ratio is switched to the second air-fuel ratio or the third air-fuel ratio. However, the detection value of the third air-fuel ratio sensor 13 is accompanied by any time delay to a certain extent. Therefore, it is more preferable that the air-fuel ratio is switched to the second air-fuel ratio or the third air-fuel ratio on the basis of the added-up value of the intake air amounts or the estimated oxygen storage amount. Note that the oxygen storage amount of the three-way catalyst 3 and the NSR catalyst 4 may be calculated by means of any other well-known method without being limited to the method described above.

The timing T3, at which the air-fuel ratio is switched from the second air-fuel ratio or the third air-fuel ratio to the lean air-fuel ratio, is provided when the $NH_3$ amount adsorbed by the SCR catalyst 5 arrives at a predetermined adsorption amount. The predetermined adsorption amount is previously acquired, for example, by means of any experiment or any simulation, as the $NH_3$ adsorption amount which makes it possible to purify NOx by the SCR catalyst 5 even when the operation is switched to the operation at the lean air-fuel ratio. The $NH_3$ amount adhered to the SCR catalyst 5 can be acquired from the $NH_3$ amount produced by the three-way catalyst 3 and the NSR catalyst 4, the $NH_3$ amount consumed by the SCR catalyst 5, and the $NH_3$ amount desorbed from the SCR catalyst 5. The $NH_3$ amount produced per unit time by the three-way catalyst 3 is correlated with the intake air amount and the air-fuel ratio. Therefore, the relationship among the $NH_3$ amount produced per unit time by the three-way catalyst 3, the intake air amount, and the air-fuel ratio can be previously acquired, for example, by means of any experiment or any simulation. The $NH_3$ amount produced per unit time by the NSR catalyst 4 is correlated with the intake air amount, the air-fuel ratio, and the NOx occlusion amount. Therefore, the relationship among the $NH_3$ amount produced per unit time by the NSR catalyst 4, the intake air amount, the air-fuel ratio, and the NOx occlusion amount can be previously acquired, for example, by means of any experiment or any simulation.

The $NH_3$ amount consumed per unit time by the SCR catalyst 5 is correlated with the temperature of the SCR catalyst 5, the intake air amount, and the NOx concentration in the exhaust gas inflowing into the SCR catalyst 5. Therefore, the relationship among the $NH_3$ amount consumed per unit time by the SCR catalyst 5, the temperature of the SCR catalyst 5, the intake air amount, and the NOx concentration in the exhaust gas inflowing into the SCR catalyst 5 can be previously acquired, for example, by means of any experiment or any simulation.

Further, the $NH_3$ amount desorbed per unit time from the SCR catalyst 5 is correlated with the temperature of the SCR catalyst 5 and the $NH_3$ adsorption amount of the SCR catalyst 5. Therefore, the relationship among the $NH_3$ amount desorbed per unit time from the SCR catalyst 5, the temperature of the SCR catalyst 5, and the $NH_3$ adsorption amount of the SCR catalyst 5 can be previously acquired, for example, by means of any experiment or any simulation. The value obtained in the previous calculation is used for the $NH_3$ adsorption amount of the SCR catalyst 5 which is utilized in this procedure. Then, the values, each of which is obtained by subtracting the $NH_3$ amount consumed per unit time by the SCR catalyst 5 and the $NH_3$ amount desorbed per unit time from the SCR catalyst 5 from the $NH_3$ amount produced per unit time by the three-way catalyst 3 and the NSR catalyst 4, are added up, and thus it is possible to calculate the $NH_3$ amount adsorbed by the SCR catalyst 5. Note that the $NH_3$ amount adsorbed by the SCR catalyst 5 may be calculated by any other well-known method without being limited to the method described above. Note that in this embodiment, ECU 10 estimates the $NH_3$ adsorption amount of the SCR catalyst 5, and thus ECU 10 functions as the controller according to the present invention.

The oxygen storage amount of the three-way catalyst 3 and the NSR catalyst 4 is gradually increased after the air-fuel ratio is switched from the second air-fuel ratio or the third air-fuel ratio to the lean air-fuel ratio at T3. The oxygen storage amount of the three-way catalyst 3 and the NSR catalyst 4, which is provided in this situation, is also correlated with the added-up value of the intake air amounts and the air-fuel ratio. Therefore, the oxygen storage amount can be calculated in accordance with this relationship.

FIG. 3 shows a flow chart illustrating a flow of the air-fuel ratio control to be performed when the operation is transferred from the operation at the theoretical air-fuel ratio to the operation at the lean air-fuel ratio according to this embodiment. This routine is executed by ECU 10 every time when a predetermined time elapses when the internal combustion engine 1 is operated at the theoretical air-fuel ratio.

In Step S101, it is judged whether or not the condition, under which the internal combustion engine 1 is operated at the lean air-fuel ratio, is established. In this step, it is judged whether or not the operation can be transferred to the operation at the lean air-fuel ratio. For example, if the load exerted on the internal combustion engine 1 is lowered from a load which is higher than a predetermined load to a load which is not more than the predetermined load, it is judged that the condition, under which the internal combustion engine 1 is operated at the lean air-fuel ratio, is established. The predetermined load is previously acquired as the load at which the operation at the lean air-fuel ratio can be performed, for example, by means of any experiment or any simulation, and the predetermined load is stored beforehand in ECU 10. Alternatively, in place of the judgment described above, it is also allowable to judge that the condition, under which the internal combustion engine 1 is operated at the lean air-fuel ratio, is established, if the warming-up for the internal combustion engine 1 is completed. In this case, ECU 10 judges whether or not the cooling water temperature or the lubricating oil temperature of the internal combustion engine 1 is the warming-up completion temperature. If the affirmative judgment is made in Step S101, the routine proceeds to Step S102. On the other hand, if the negative judgment is made, this routine is terminated.

In Step S102, the target air-fuel ratio of the internal combustion engine 1 is changed to the first air-fuel ratio. In this step, the air-fuel ratio is set to a relatively low air-fuel ratio in the beginning in order to promptly release oxygen from the three-way catalyst 3 and the NSR catalyst 4. When the target air-fuel ratio is changed to the first air-fuel ratio, ECU 10 adjusts, for example, the fuel injection amount, the intake air amount, and the ignition timing to the values which are to be used when the operation is performed at the first air-fuel ratio. For example, the fuel injection amount, the intake air amount, and the ignition timing, which are used in this procedure, are previously acquired, for example, by means of any experiment or any simulation, while being correlated with the operation state of the internal combustion engine 1. If the process of Step S102 is completed, the routine proceeds to Step S103.

In Step S103, the oxygen storage amount of the three-way catalyst 3 and the NSR catalyst 4 at the present point in time is read. ECU 10 estimates the oxygen storage amount as required, distinctly from this flow chart, on the basis of the added-up value of the intake air amounts and the air-fuel ratio. In this step, the estimated oxygen storage amount is read. The relationship among the added-up value of the intake air amounts, the air-fuel ratio, and the oxygen storage amount is previously acquired, for example, by means of any experiment or any simulation, and the relationship is stored beforehand in ECU 10. If the process of Step S103 is completed, the routine proceeds to Step S104.

In Step S104, it is judged whether or not the oxygen storage amount read in Step S103 is not more than a predetermined storage amount. In this step, it is judged whether or not the release of oxygen from the three-way catalyst 3 and the NSR catalyst 4 is completed. That is, the predetermined storage amount is the oxygen storage amount with which it is possible to assume that the release of oxygen from the three-way catalyst 3 and the NSR catalyst 4 is completed. Note that the predetermined storage amount may be zero. If the affirmative judgment is made in Step S104, the routine proceeds to Step S106. On the other hand, if the negative judgment is made, the routine proceeds to Step S105.

In Step S105, it is judged whether or not the condition, under which the internal combustion engine 1 is operated at the lean air-fuel ratio, is established. When the operation is performed at the first air-fuel ratio, for example, if the load on the internal combustion engine 1 is higher than the predetermined load, then the condition, under which the internal combustion engine 1 is operated at the lean air-fuel ratio, is not established, and it is necessary to perform the operation at the theoretical air-fuel ratio. In such a situation, it is also unnecessary to perform the rich spike which is to be carried out before the operation is transferred to the operation at the lean air-fuel ratio. Therefore, it is also unnecessary to perform the operation at the first air-fuel ratio. Therefore, the operation at the first air-fuel ratio is terminated, and the operation is transferred to the operation at the theoretical air-fuel ratio. That is, if the affirmative judgment is made in Step S105, then the routine returns to Step S103, and the operation at the first air-fuel ratio is continued. On the other hand, if the negative judgment is made in Step S105, then the routine proceeds to Step S114, and the target air-fuel ratio of the internal combustion engine 1 is changed to the theoretical air-fuel ratio. If the negative judgment is made in Step S105, it is tried again to switch the air-fuel ratio to the lean air-fuel ratio in accordance with this flow chart, provided that the condition, under which the internal combustion engine 1 is operated at the lean air-fuel ratio, is established thereafter.

In Step S106, the NOx occlusion amount of the NSR catalyst 4 at the present point in time is read. ECU 10 calculates the estimated NOx occlusion amount as required as described above, distinctly from this flow chart. In this step, the estimated NOx occlusion amount calculated by ECU 10 is read. The estimated NOx occlusion amount, which is read in Step S106, is the estimated NOx occlusion amount which is provided at the point in time at which the operation at the first air-fuel ratio is terminated. If the process of Step S106 is completed, the routine proceeds to Step S107.

In Step S107, it is judged whether or not the NOx occlusion amount read in Step S106 is smaller than an occlusion amount threshold value. In Step S107, it is judged whether or not such a state arises that a sufficient amount of $NH_3$ cannot be produced by the NSR catalyst 4. The occlusion amount threshold value is previously acquired, for example, by means of any experiment or any simulation, and the occlusion amount threshold value is stored beforehand in ECU 10. If the affirmative judgment is made in Step S107, the routine proceeds to Step S108. On the other hand, if the negative judgment is made, the routine proceeds to Step S109.

In Step S108, the target air-fuel ratio of the internal combustion engine 1 is changed to the second air-fuel ratio. In this step, the air-fuel ratio is set so that the production amount of $NH_3$ is maximized in the three-way catalyst 3 at the operation state of the internal combustion engine 1 at the present point in time and the temperature of the three-way catalyst 3, in order to promptly supply $NH_3$ to the SCR catalyst 5. Note that the second air-fuel ratio is not limited to the air-fuel ratio at which the production amount of $NH_3$ is maximized in the three-way catalyst 3. It is allowable that the second air-fuel ratio is an air-fuel ratio which is higher than the first air-fuel ratio and the third air-fuel ratio and which increases the production amount of $NH_3$ as compared with if the operation is performed at the first air-fuel ratio and the third air-fuel ratio in place of the second air-fuel ratio. If the process of Step S108 is completed, the routine proceeds to Step S110.

On the other hand, in Step S109, the target air-fuel ratio of the internal combustion engine 1 is changed to the third air-fuel ratio. In this step, the air-fuel ratio is set to such an air-fuel ratio that the amount of production of $NH_3$ is maximized in the NSR catalyst 4 in relation to the operation state of the internal combustion engine 1 provided at the present point in time and the temperature of the NSR catalyst 4, in order to promptly supply $NH_3$ to the SCR catalyst 5. Note that the third air-fuel ratio is not limited to the air-fuel ratio at which the production amount of $NH_3$ is maximized in the NSR catalyst 4. It is allowable that the third air-fuel ratio is an air-fuel ratio which is higher than the first air-fuel ratio and which is lower than the second air-fuel ratio, and the amount of production of $NH_3$ is increased at the air-fuel ratio as compared with a case in which the operation is performed at the first air-fuel ratio or the second air-fuel ratio in place of the third air-fuel ratio. If the process of Step S109 is completed, the routine proceeds to Step S110.

In Step S110, the $NH_3$ adsorption amount of the SCR catalyst 5 at the present point in time is read. ECU 10 estimates the $NH_3$ adsorption amount as required distinctly from this flow chart as described above on the basis of the $NH_3$ amount produced by the three-way catalyst 3 or the $NH_3$ amount produced by the NSR catalyst 4, the $NH_3$ amount consumed by the SCR catalyst 5, and the $NH_3$ amount desorbed from the SCR catalyst 5. In this step, the estimated $NH_3$ adsorption amount is read. If the process of Step S110 is completed, the routine proceeds to Step S111.

In Step S111, it is judged whether or not the $NH_3$ adsorption amount read in Step S110 is not less than a predetermined adsorption amount. In this step, it is judged whether or not a sufficient amount of $NH_3$ is adsorbed to the SCR catalyst 5. The predetermined adsorption amount is previously acquired, for example, by means of any experiment or any simulation, and the predetermined adsorption amount is stored beforehand in ECU 10. If the affirmative judgment is made in Step S111, the routine proceeds to Step S112. On the other hand, if the negative judgment is made, the routine proceeds to Step S113.

In Step S113, it is judged whether or not the condition, under which the internal combustion engine 1 is operated at the lean air-fuel ratio, is established. When the operation is performed at the second air-fuel ratio or the third air-fuel ratio, for example, if the load on the internal combustion engine 1 is higher than a predetermined load, then the condition, under which the internal combustion engine 1 is operated at the lean air-fuel ratio, is not established, and it is necessary to perform the operation at the theoretical air-fuel ratio. In such a situation, the rich spike, which is to be carried out before the operation is transferred to the operation at the lean air-fuel ratio, is unnecessary as well. Therefore, it is also unnecessary to perform the operation at the second air-fuel ratio or the third air-fuel ratio. Therefore, the operation at the second air-fuel ratio or the third air-fuel ratio is terminated, and the operation is transferred to the operation at the theoretical air-fuel ratio. That is, if the affirmative judgment is made in Step S113, then the routine returns to Step S110, and the operation at the second air-fuel ratio or the third air-fuel ratio is continued. On the other hand, if the negative judgment is made in Step S113, then the routine proceeds to Step S114, and the target air-fuel ratio of the internal combustion engine 1 is changed to the theoretical air-fuel ratio. If the negative judgment is made in Step S113, it is tried again to switch the air-fuel ratio to the lean air-fuel ratio in accordance with this flow chart, provided that the condition, under which the internal combustion engine 1 is operated at the lean air-fuel ratio, is established thereafter.

In Step S112, the target air-fuel ratio of the internal combustion engine 1 is changed to the lean air-fuel ratio, and then this flow chart is terminated. The lean air-fuel ratio, which is provided in this situation, is the definitive target air-fuel ratio, which is the air-fuel ratio corresponding to the operation state of the internal combustion engine 1. An optimum value is previously acquired for the target air-fuel ratio by means of any experiment or any simulation.

Note that in Step S104, it is judged whether or not the oxygen storage amount read in Step S103 is not more than the predetermined storage amount. However, in place of this procedure, it is also allowable to judge whether or not the detection value of the third air-fuel ratio sensor 13 is less than the theoretical air-fuel ratio. In this case, it is unnecessary to perform Step S103. In this context, FIG. 4 shows a flow chart illustrating a flow of the air-fuel ratio control to be performed when the operation is transferred from the operation at the theoretical air-fuel ratio to the operation at the lean air-fuel ratio according to this embodiment. This routine is executed by ECU 10 every time when a predetermined time elapses when the internal combustion engine 1 is operated at the theoretical air-fuel ratio. As compared with FIG. 3, the process merely differs in that Step S103 is omitted and Step S115 is executed in place of Step S104. Therefore, as for the other steps, the explanation and the illustration of some parts are omitted.

In the flow chart shown in FIG. 4, if the process of Step S102 is terminated, the routine proceeds to Step S115. In Step S115, it is judged whether or not the detection value of the third air-fuel ratio sensor 13 (NSR catalyst A/F) is less than the theoretical air-fuel ratio. In Step S115, it is judged whether or not the release of oxygen from the three-way catalyst 3 and the NSR catalyst 4 is completed, on the basis of the detection value of the third air-fuel ratio sensor 13. That is, if the release of oxygen from the three-way catalyst 3 and the NSR catalyst 4 is completed, the air-fuel ratio of the exhaust gas outflowing from the NSR catalyst 4 is changed from the theoretical air-fuel ratio to the rich air-fuel ratio. On this account, it is judged that the release of oxygen from the three-way catalyst 3 and the NSR catalyst 4 is completed in accordance with the fact that the detection value of the third air-fuel ratio sensor 13 is less than the theoretical air-fuel ratio. If the affirmative judgment is made in Step S115, the routine proceeds to Step S106. On the other hand, if the negative judgment is made, the routine proceeds to Step S105. Further, if the affirmative judgment is made in Step S105, the routine returns to Step S115.

As explained above, according to this embodiment, the air-fuel ratio is set to the first air-fuel ratio in the beginning before the operation is switched to the operation at the lean air-fuel ratio after the operation at the theoretical air-fuel ratio. Thus, it is possible to promptly release oxygen from the three-way catalyst 3 and the NSR catalyst 4. Accordingly, it is possible to shorten the period until the supply of $NH_3$ to the SCR catalyst 5 is started. Subsequently, the air-fuel ratio is set to the second air-fuel ratio or the third air-fuel ratio, and thus it is possible to promptly increase the $NH_3$ adsorption amount of the SCR catalyst 5. Further, the second air-fuel ratio is made to be higher than the third air-fuel ratio. Thus, even when an amount of NOx, which is sufficient to produce $NH_3$, is not occluded by the NSR catalyst 4, it is possible to promptly produce $NH_3$ by means of the three-way catalyst 3. Therefore, the air-fuel ratio can be promptly switched to the lean air-fuel ratio, and it is possible to maintain the high NOx purification rate after switching the air-fuel ratio to the lean air-fuel ratio.

Second Embodiment

In the first embodiment, the timing T2, at which the air-fuel ratio is switched from the first air-fuel ratio to the second air-fuel ratio, is determined on the basis of the oxygen storage amount estimated by ECU 10. However, the actual oxygen storage amount may be changed due to the deterioration of the three-way catalyst 3 or the NSR catalyst 4. In such a situation, any difference appears in some cases between the actual oxygen storage amount and the estimated oxygen storage amount. On this account, if the air-fuel ratio is switched from the first air-fuel ratio to the second air-fuel ratio on the basis of the estimated value of the oxygen storage amount, it is feared that the timing, at which the air-fuel ratio is switched, may be inappropriate. In view of the above, in this embodiment, the timing, at which ECU 10 switches the air-fuel ratio from the first air-fuel ratio to the second air-fuel ratio, is determined by using the detection value of the third air-fuel ratio sensor 13 in combination.

In this context, FIG. 5 shows a time chart illustrating the transition of the target air-fuel ratio (target A/F), the estimated value of the oxygen storage amount, the air-fuel ratio of the exhaust gas outflowing from the three-way catalyst 3 (three-way catalyst A/F), and the air-fuel ratio of the exhaust gas outflowing from the NSR catalyst 4 (NSR catalyst A/F), when the rich spike is carried out when the operation is transferred from the operation at the theoretical air-fuel ratio to the operation at the lean air-fuel ratio. The estimated value of the oxygen storage amount is estimated by means of the method explained in the first embodiment. FIG. 5 shows a case in which the air-fuel ratio of the exhaust gas outflowing from the NSR catalyst 4 becomes the rich air-fuel ratio before the estimated oxygen storage amount becomes substantially zero. Further, FIG. 5 shows a case in which the air-fuel ratio is switched from the first air-fuel ratio to the second air-fuel ratio.

If the target air-fuel ratio of the internal combustion engine 1 is switched from the theoretical air-fuel ratio to the first air-fuel ratio, oxygen is released principally from the three-way catalyst 3 in the beginning. Then, if the release of oxygen from the three-way catalyst 3 is completed, the air-fuel ratio of the exhaust gas outflowing from the three-way catalyst 3 is changed to the rich air-fuel ratio (T21 shown in FIG. 5). Subsequently, if the release of oxygen of the NSR catalyst 4 is completed, the air-fuel ratio of the exhaust gas outflowing from the NSR catalyst 4 is changed to the rich air-fuel ratio (T22 shown in FIG. 5). In this situation, the release of oxygen from the three-way catalyst 3 and the NSR catalyst 4 is actually completed, but the estimated value of the oxygen storage amount is still large. Then, with reference to FIG. 5, the estimated value of the oxygen storage amount is substantially zero at the point in time indicated by T23. That is, it is considered that the actual relationship between the added-up value of the intake air amounts and the oxygen storage amount is deviated from the relationship which is previously stored in ECU 10. In view of the above, in this embodiment, even when the situation, in which the estimated value of the oxygen storage amount is not more than the predetermined storage amount, does not arises, if the detection value of the third air-fuel ratio sensor 13 is changed to the rich air-fuel ratio, then ECU 10 switches the target air-fuel ratio of the internal combustion engine 1 from the first air-fuel ratio to the second air-fuel ratio. Note that in this embodiment, ECU 10 switches the target air-fuel ratio of the internal combustion engine 1 from the first air-fuel ratio to the second air-fuel ratio on the basis of the detection value of the third air-fuel ratio sensor 13, and thus ECU 10 functions as the controller according to the present invention.

FIG. 6 shows a flow chart illustrating a flow of the air-fuel ratio control to be performed when the operation is transferred from the operation at the theoretical air-fuel ratio to the operation at the lean air-fuel ratio according to this embodiment. This routine is executed by ECU 10 every time when a predetermined time elapses when the internal combustion engine 1 is operated at the theoretical air-fuel ratio. The steps, in which the same processes as those depicted in the flow chart shown in FIG. 3 are performed, are designated by the same reference numerals, any explanation of which will be omitted. Further, the processes to be performed in and after Step S106 and the processes to be performed if the negative judgment is made in Step S105 are the same as those of the flow chart shown in FIG. 3, and any illustration of which will be omitted.

In the flow chart shown in FIG. 6, if the negative judgment is made in Step S104, the routine proceeds to Step S201. In Step S201, it is judged whether or not the detection value of the third air-fuel ratio sensor 13 (NSR catalyst A/F) is less than the theoretical air-fuel ratio. In this step, it is judged whether or not the release of oxygen from the three-way catalyst 3 and the NSR catalyst 4 is completed, on the basis of the detection value of the third air-fuel ratio sensor 13. If the affirmative judgment is made in Step S201, the routine proceeds to Step S106. On the other hand, if the negative judgment is made, the routine proceeds to Step S105.

As explained above, according to this embodiment, it is possible to obtain the more appropriate timing at which the air-fuel ratio is switched from the first air-fuel ratio to the second air-fuel ratio or the third air-fuel ratio.

Third Embodiment

In the second embodiment, the timing, at which the air-fuel ratio is switched from the first air-fuel ratio to the second air-fuel ratio, is determined by using the detection value of the third air-fuel ratio sensor 13 in combination. In this embodiment, ECU 10 further corrects the estimated value of the oxygen storage amount or the predetermined storage amount on the basis of the estimated value of the oxygen storage amount provided at the point in time at which the detection value of the third air-fuel ratio sensor 13 is changed. That is, the estimated value of the oxygen storage amount or the predetermined storage amount is corrected so that the estimated value of the oxygen storage amount is equal to the predetermined storage amount at the point in time at which the air-fuel ratio of the exhaust gas outflowing from the NSR catalyst 4 is changed to the rich air-fuel ratio. In this embodiment, the estimated value of the oxygen storage amount, which is provided at the point in time at which the detection value of the third air-fuel ratio sensor 13 is changed to the rich air-fuel ratio, is used as the predetermined storage amount, and thus the predetermined storage amount is corrected. Note that it is previously confirmed that the third air-fuel ratio sensor 13 has no abnormality, by means of any well-known technique. In this embodiment, ECU 10 corrects the estimated value of the oxygen storage amount or the predetermined storage amount, and thus ECU 10 functions as the controller according to the present invention.

Note that when the estimated value of the oxygen storage amount is corrected, then the estimated value of the oxygen storage amount provided when the operation is performed at the theoretical air-fuel ratio may be corrected, or the estimated value of the oxygen storage amount provided when the operation is performed at the first air-fuel ratio may be corrected. In place of the correction of the predetermined storage amount, it is also allowable to correct the added-up value of the intake air amounts provided when the operation is performed at the first air-fuel ratio. That is, any correcting method is available without causing any problem provided that the estimated value of the oxygen storage amount is equal to the predetermined storage amount at the point in time at which the detection value of the third air-fuel ratio sensor 13 is changed to the rich air-fuel ratio.

Further, the correction according to this embodiment may be performed as long as the timing, at which the air-fuel ratio is switched from the first air-fuel ratio to the second air-fuel ratio or the third air-fuel ratio, is advanced. In this procedure, when the operation is performed at the first air-fuel ratio, the HC concentration in the exhaust gas is raised. When the correction is performed so that the timing, at which the air-fuel ratio is switched from the first air-fuel ratio to the second air-fuel ratio or the third air-fuel ratio, is advanced, the correction is performed so that the period, in which the operation is performed at the first air-fuel ratio, is shortened. Therefore, the period, in which the operation is performed at the lower air-fuel ratio, is shortened, and it is possible to reduce HC passing through the respective catalysts. On the other hand, when the correction is performed so that the timing, at which the air-fuel ratio is switched from the first air-fuel ratio to the second air-fuel ratio or the third air-fuel ratio, is delayed, the correction is performed so that the period, in which the operation is performed at the first air-fuel ratio, is prolonged. Therefore, the period, in which the operation is performed at the lower air-fuel ratio, is prolonged, and it is feared that HC passing through the respective catalysts may be increased. Therefore, when the estimated value of the oxygen storage amount or the predetermined storage amount is corrected as long as the timing, at which the air-fuel ratio is switched to the second air-fuel ratio or the third air-fuel ratio, is advanced, it is thereby possible to reduce the HC amount released into the atmospheric air. Note that when the timing, at which the air-fuel ratio is switched from the first air-fuel ratio to the second air-fuel ratio or the third air-fuel ratio, is delayed if the estimated value of the oxygen storage amount or the predetermined storage amount is corrected, then the estimated value of the oxygen storage amount or the predetermined storage amount is not corrected. In this case, the air-fuel ratio is switched from the first air-fuel ratio to the second air-fuel ratio or the third air-fuel ratio in a state in which oxygen is stored in the three-way catalyst 3 or the NSR catalyst 4. However, even when the estimated value of the oxygen storage amount or the predetermined storage amount is not corrected, it is possible to release oxygen from the three-way catalyst 3 and the NSR catalyst 4 after the air-fuel ratio is switched to the second air-fuel ratio or the third air-fuel ratio. Therefore, even when the estimated value of the oxygen storage amount or the predetermined storage amount is corrected as long as the timing, at which the air-fuel ratio is switched from the first air-fuel ratio to the second air-fuel ratio or the third air-fuel ratio, is advanced, while giving the priority to the reduction of the HC amount passing through the respective catalysts, the procedure is not deviated from the gist or essential characteristics of the present invention, which is preferred, because it is possible to suppress HC.

FIG. 7 shows a flow chart illustrating a flow of the air-fuel ratio control to be performed when the operation is transferred from the operation at the theoretical air-fuel ratio to the operation at the lean air-fuel ratio according to this embodiment. This routine is executed by ECU 10 every time when a predetermined time elapses when the internal combustion engine 1 is operated at the theoretical air-fuel ratio. The steps, in which the same processes as those depicted in the flow chart shown in FIG. 3 or FIG. 6 are performed, are designated by the same reference numerals, any explanation of which will be omitted. Further, the processes to be performed in and after Step S106 and the processes to be performed if the negative judgment is made in Step S105 are the same as those depicted in the flow chart shown in FIG. 3, any illustration of which will be omitted.

In the flow chart shown in FIG. 7, if the affirmative judgment is made in Step S201, the routine proceeds to Step S301. In Step S301, the predetermined storage amount is corrected. That is, the estimated value of the oxygen storage amount, which is provided at the point in time at which the detection value of the third air-fuel ratio sensor 13 is changed from the theoretical air-fuel ratio to the rich air-fuel ratio, is used as the predetermined storage amount which is newly stored by ECU 10. The predetermined storage amount after the update is used in Step S104 next time and thereafter. Note that the predetermined storage amount is corrected as long as the affirmative judgment is made in Step S201. Therefore, the predetermined storage amount is corrected before the affirmative judgment is made in S104. In this case, the timing, at which the air-fuel ratio is switched from the first air-fuel ratio to the second air-fuel ratio or the third air-fuel ratio, is advanced as compared with the timing at which the air-fuel ratio is switched on the basis of the estimated value of the oxygen storage amount. Therefore, it is affirmed that the predetermined storage amount is corrected as long as the timing, at which the air-fuel ratio is switched from the first air-fuel ratio to the second air-fuel ratio or the third air-fuel ratio, is advanced. If the process of Step S301 is completed, the routine proceeds to Step S106. Note that in this embodiment, ECU 10 executes the process of Step S104, and thus ECU 10 functions as the controller according to the present invention.

Note that when the estimated value of the oxygen storage amount or the predetermined storage amount is corrected, it is also allowable to consider the time delay until the detection value of the third air-fuel ratio sensor 13 is changed after the release of oxygen from the NSR catalyst 4 is completed. That is, the estimated value of the oxygen storage amount or the predetermined storage amount may be corrected so that the estimated value of oxygen storage amount is equal to the predetermined storage amount at a point in time which is earlier by an amount of the time delay. The time delay can be calculated on the basis of the exhaust gas flow rate and the distance from the NSR catalyst 4 to the third air-fuel ratio sensor 13.

As explained above, according to this embodiment, the timing, at which the air-fuel ratio is changed from the first air-fuel ratio to the second air-fuel ratio on the basis of the estimated value of the oxygen storage amount, can be the more appropriate timing.

Fourth Embodiment

In this embodiment, the air-fuel ratio is switched to the lean air-fuel ratio after performing the operation at the first air-fuel ratio and the operation at the second air-fuel ratio as long as the $NH_3$ adsorption amount of the SCR catalyst 5 is less than the adsorption amount threshold value before the operation is switched to the operation at the lean air-fuel ratio after the operation at the theoretical air-fuel ratio. If the $NH_3$ adsorption amount of the SCR catalyst 5 is not less than the adsorption amount threshold value, ECU 10 immediately switches the air-fuel ratio from the theoretical air-fuel ratio to the lean air-fuel ratio without performing the operation at the rich air-fuel ratio. Note that in this embodiment, ECU 10 immediately switches the air-fuel ratio from the theoretical air-fuel ratio to the lean air-fuel ratio without performing the operation at the rich air-fuel ratio when the $NH_3$ adsorption amount of the SCR catalyst 5 is not less than the adsorption amount threshold value, and thus ECU 10 functions as the controller according to the present invention.

In this procedure, if $NH_3$, which is in an amount of not less than the adsorption amount threshold value, is adsorbed to the SCR catalyst 5, it is unnecessary to produce $NH_3$ by the three-way catalyst 3 or the NSR catalyst 4. Therefore, it is appropriate to produce $NH_3$ by using at least one of the three-way catalyst 3 and the NSR catalyst 4 as long as the $NH_3$ adsorption amount of the SCR catalyst 5 is less than the adsorption amount threshold value. The adsorption amount threshold value is the $NH_3$ adsorption amount with which it is possible to purify NOx by means of the SCR catalyst 5 after the air-fuel ratio is switched to the lean air-fuel ratio. Note that the adsorption amount threshold value may be the same value as that of the predetermined adsorption amount described above, or it may be any different value.

FIG. 8 shows a flow chart illustrating a flow of the air-fuel ratio control to be performed when the operation is transferred from the operation at the theoretical air-fuel ratio to the operation at the lean air-fuel ratio according to this embodiment. This routine is executed by ECU 10 every time when a predetermined time elapses when the internal combustion engine 1 is operated at the theoretical air-fuel ratio. The steps, in which the same processes as those depicted in the flow chart described above are performed, are designated by the same reference numerals, any explanation of which will be omitted. Further, the processes to be performed in and after Step S102 are the same as those depicted in the flow chart shown in FIG. 3, FIG. 4, FIG. 6, or FIG. 7, and hence the illustration of some parts will be omitted.

In the flow chart shown in FIG. 8, if the affirmative judgment is made in Step S101, the routine proceeds to Step S401. In Step S401, it is judged whether or not the $NH_3$ adsorption amount of the SCR catalyst 5 is less than the adsorption amount threshold value. The adsorption amount threshold value is previously acquired, for example, by means of any experiment or any simulation and stored beforehand in ECU 10. If the affirmative judgment is made in Step S401, the routine proceeds to Step S102. On the other hand, if the negative judgment is made, the routine proceeds to Step S112. That is, if the $NH_3$ adsorption amount of the SCR catalyst 5 is not less than the adsorption amount threshold value, the target air-fuel ratio of the internal combustion engine 1 is changed to the lean air-fuel ratio without providing the rich air-fuel ratio.

As explained above, according to this embodiment, the air-fuel ratio is promptly switched to the lean air-fuel ratio, if it is unnecessary to perform the operation at the first air-fuel ratio, the second air-fuel ratio, and the third air-fuel ratio. Therefore, it is possible to reduce the consumption amount of the fuel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An exhaust gas purification apparatus for an internal combustion engine, comprising:
    a three-way catalyst which is provided for an exhaust gas passage of the internal combustion engine, which has an ability to store oxygen, and which produces $NH_3$ when an air-fuel ratio of an exhaust gas is lower than a theoretical air-fuel ratio;
    a storage reduction NOx catalyst which is provided for the exhaust gas passage downstream from the three-way catalyst, which has an ability to store oxygen, which is a catalyst to occlude NOx when the air-fuel ratio of the exhaust gas is a lean air-fuel ratio, and which reduces NOx occluded by the catalyst when the air-fuel ratio of the exhaust gas is not more than the theoretical air-fuel ratio;
    a selective catalytic reduction NOx catalyst which is provided for the exhaust gas passage downstream from the storage reduction NOx catalyst and which reduces NOx by using $NH_3$ as a reducing agent; and
    a controller comprising at least one processor configured to adjust the air-fuel ratio in the internal combustion engine, wherein:
    the controller farther configured to:
        estimate a NOx occlusion amount of the storage reduction NOx catalyst;
        estimate an $NH_3$ adsorption amount of the selective catalytic reduction NOx catalyst; and
        operate such that the air-fuel ratio is set to a first air-fuel ratio which is lower than the theoretical air-fuel ratio during a period corresponding to an oxygen storage amount of the three-way catalyst and the storage reduction NOx catalyst before the air-fuel ratio in the internal combustion engine is switched from the theoretical air-fuel ratio to the lean air-fuel ratio; the air-fuel ratio in the internal combustion engine is set to a second air-fuel ratio which is higher than the first air-fuel ratio and which is lower than the theoretical air-fuel ratio until the $NH_3$ adsorption amount, which is estimated by the controller, becomes a predetermined adsorption amount after the period corresponding to the oxygen storage amount is terminated if the NOx occlusion amount, which is estimated by the controller, is less than an occlusion amount threshold value at a point in time at which the period corresponding to the oxygen storage amount is terminated; the air-fuel ratio is switched to the lean air-fuel ratio if the $NH_3$ adsorption amount, which is estimated by the controller, becomes the predetermined adsorption amount; the air-fuel ratio in the internal combustion engine is set to a third air-fuel ratio which is higher than the first air-fuel ratio and which is lower than the second air-fuel ratio until the $NH_3$ adsorption amount, which is estimated by the controller, becomes the predetermined adsorption amount after the period corresponding to the oxygen storage amount is terminated if the NOx occlusion amount, which is estimated by the controller, is not less than the occlusion amount threshold value at the point in time at which the period corresponding to the oxygen storage amount is terminated; and the air-fuel ratio is switched to the lean air-fuel ratio if the $NH_3$ adsorption amount, which is estimated by the controller, becomes the predetermined adsorption amount.

2. The exhaust gas purification apparatus for the internal combustion engine according to claim 1, wherein the second air-fuel ratio is such an air-fuel ratio that an amount of production of $NH_3$ is increased in the three-way catalyst as compared with the third air-fuel ratio, if the NOx occlusion amount, which is estimated by the controller, is less than the occlusion amount threshold value at the point in time at which the period corresponding to the oxygen storage amount is terminated.

3. The exhaust gas purification apparatus for the internal combustion engine according to claim 1, further comprising:
an air-fuel ratio sensor which detects the air-fuel ratio of the exhaust gas at the exhaust gas passage downstream from the storage reduction NOx catalyst and upstream from the selective catalytic reduction NOx catalyst, wherein:
the controller farther configured to switch the air-fuel ratio to the second air-fuel ratio or the third air-fuel ratio assuming that the period corresponding to the oxygen storage amount is terminated, if the air-fuel ratio, which is detected by the air-fuel ratio sensor, is changed from the theoretical air-fuel ratio to a rich air-fuel ratio when the air-fuel ratio is set to the first air-fuel ratio.

4. The exhaust gas purification apparatus for the internal combustion engine according to claim 1, further comprising:
an air-fuel ratio sensor which detects the air-fuel ratio of the exhaust gas at the exhaust gas passage downstream from the storage reduction NOx catalyst and upstream from the selective catalytic reduction NOx catalyst, wherein:
the controller farther configured to:
estimate the oxygen storage amount of the three-way catalyst and the storage reduction NOx catalyst;
switch the air-fuel ratio from the first air-fuel ratio to the second air-fuel ratio or the third air-fuel ratio if the oxygen storage amount, which is estimated by the controller, is not more than a predetermined storage amount when the air-fuel ratio is set to the first air-fuel ratio; and
correct the oxygen storage amount which is estimated by the controller or the predetermined storage amount so that the oxygen storage amount, which is estimated by the controller at a point in time at which the air-fuel ratio detected by the air-fuel ratio sensor is changed from the theoretical air-fuel ratio to a rich air-fuel ratio, is equal to the predetermined storage amount.

5. The exhaust gas purification apparatus for the internal combustion engine according to claim 1, wherein the controller farther configured to switch the air-fuel ratio to the lean air-fuel ratio without providing the first air-fuel ratio and the second air-fuel ratio or the third air-fuel ratio if the $NH_3$ adsorption amount, which is estimated by the controller, is not less than an adsorption amount threshold value before the air-fuel ratio in the internal combustion engine is switched from the theoretical air-fuel ratio to the lean air-fuel ratio.

* * * * *